United States Patent [19]
Maeda

[11] Patent Number: 5,937,398
[45] Date of Patent: Aug. 10, 1999

[54] TOPOLOGICAL MAP COMPUTATION SYSTEM AND METHOD IN WHICH THE CONTINUITY OF CHANGES IN INPUT PATTERNS IS CONSIDERED

[75] Inventor: Yoshiharu Maeda, Kawasaki, Japan

[73] Assignee: Fujitsu Limited, Kawasaki, Japan

[21] Appl. No.: 08/828,693

[22] Filed: Mar. 31, 1997

[30] Foreign Application Priority Data

Jul. 24, 1996 [JP] Japan ................................. 8-194873

[51] Int. Cl.$^6$ ................................................. G06F 15/18
[52] U.S. Cl. ................................................. 706/32; 706/20
[58] Field of Search ................................. 706/16, 26, 39, 706/32, 20

[56] References Cited

U.S. PATENT DOCUMENTS

| | | | |
|---|---|---|---|
| 5,222,210 | 6/1993 | Leivian | 345/357 |
| 5,416,308 | 5/1995 | Hood et al. | 235/454 |
| 5,461,696 | 10/1995 | Frank et al. | 706/20 |
| 5,557,686 | 9/1996 | Brown et al. | 382/115 |
| 5,594,503 | 1/1997 | Miyazawa | 348/414 |
| 5,710,830 | 1/1998 | Holeva | 382/173 |
| 5,727,130 | 3/1998 | Hung | 706/13 |

OTHER PUBLICATIONS

Göppert et al, "Regularized SOM–Training: A Solution to the Topology–Approximation Dilemma?", IEEE ICNN, Jun. 1996.

Chandrasekaran et al, "An Extended Self–Organizing Map with Gated Neurons", IEEE ICNN, 1993.

Richard Lippmann, "Neural Nets for Computing", IEEE International Conference on Acoustics, Speech & Signal Processing, 1988.

Ronald Holdaway, "Enhancing Supervised Learning Algorithms Via Self–Organization", IEEE ICNN, 1989.

T. Kohonen, "The Self–Organizing Map"; Proceedings of the IEEE, vol. 78, No. 9, (Sep. 1990), pp. 1464–1480.

T. Kohonen, "Self–Organized Formation of Topologically Correct Feature Maps"; Biological Cybernetics, 43, 59–69 (1982), pp. 59–69.

*Primary Examiner*—Robert W. Downs
*Attorney, Agent, or Firm*—Staas & Halsey

[57] ABSTRACT

In a computation system for a topological map, a winner-unit-candidate-set calculation module calculates a winner unit candidate set which is the set of candidates for a winner unit corresponding to an input vector at a current input timing, on the topological map. The calculation module calculates the winner unit candidate set on the basis of, for example, a winner unit having been calculated at a past input timing near the current input timing. A winner-unit calculation module calculates the winner unit which corresponds to the input vector at the current input timing, as the unit which has received the maximum input among the units contained in the winner unit candidate set calculated by the winner-unit-candidate-set calculation module.

13 Claims, 19 Drawing Sheets

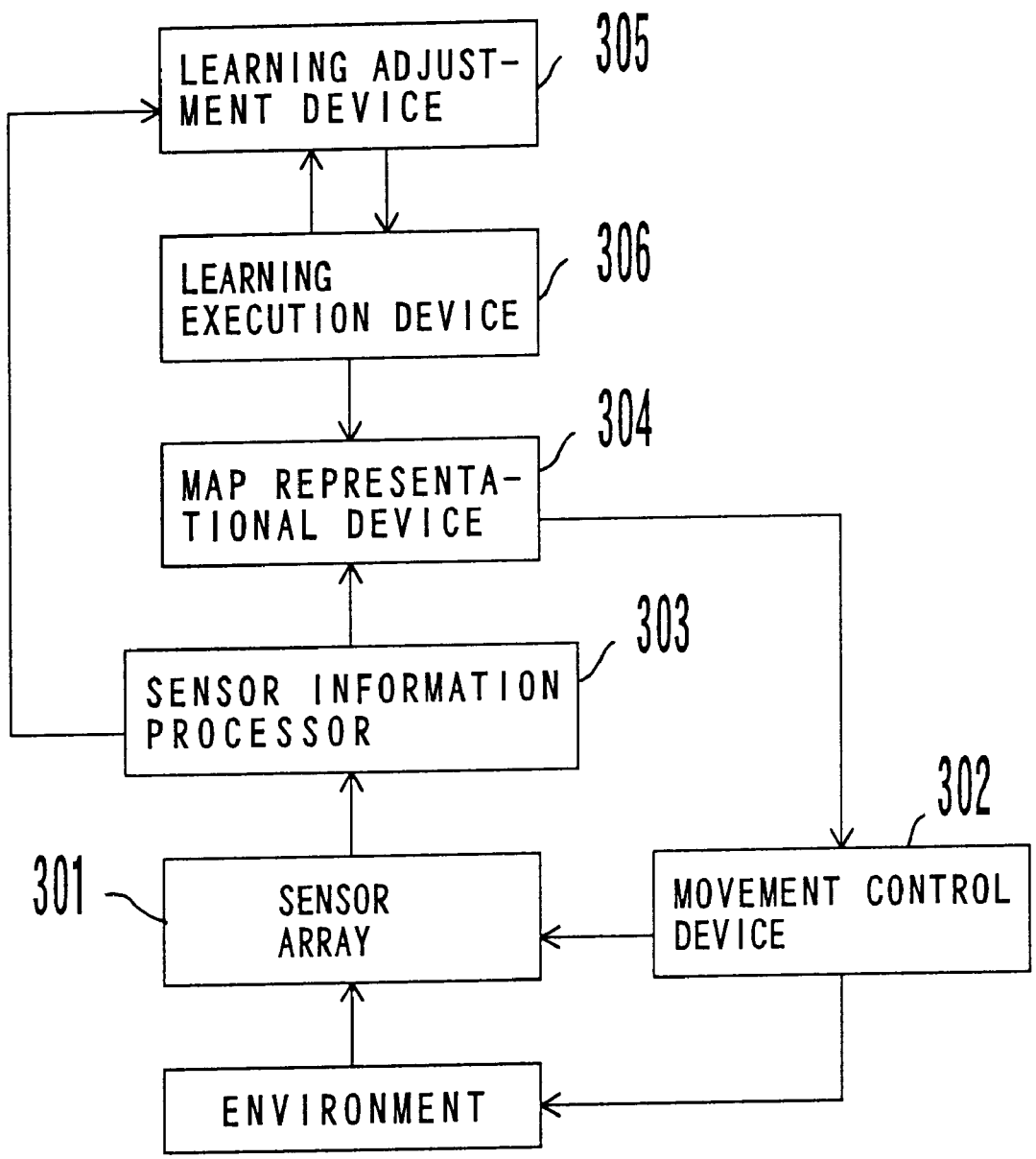
F I G. 3

FIG. 5A

| FIRST COMPONENT | SECOND COMPONENT |
|---|---|
| 0.00000(m=0.00) | 0.00000(m=0.00) |
| 0.00052(m=0.27) | 0.00052(m=0.27) |
| 0.03941(m=0.55) | 0.03941(m=0.55) |
| 0.40645(m=0.82) | 0.40645(m=0.82) |
| 0.56724(m=1.09) | 0.56724(m=1.09) |
| 0.10714(m=1.36) | 0.10714(m=1.36) |
| 0.00274(m=1.64) | 0.00274(m=1.64) |
| 0.00001(m=1.91) | 0.00001(m=1.91) |
| 0.00000(m=2.18) | 0.00000(m=2.18) |
| 0.00000(m=2.45) | 0.00000(m=2.45) |
| 0.00000(m=2.73) | 0.00000(m=2.73) |

FIG. 5B

| FIRST COMPONENT | SECOND COMPONENT |
|---|---|
| 0.00000(m=0.00) | 0.00000(m=0.00) |
| 0.00000(m=0.27) | 0.00000(m=0.27) |
| 0.00000(m=0.55) | 0.00000(m=0.55) |
| 0.00000(m=0.82) | 0.00000(m=0.82) |
| 0.00001(m=1.09) | 0.00001(m=1.09) |
| 0.00274(m=1.36) | 0.00274(m=1.36) |
| 0.10714(m=1.64) | 0.10714(m=1.64) |
| 0.56724(m=1.91) | 0.56724(m=1.91) |
| 0.40645(m=2.18) | 0.40645(m=2.18) |
| 0.03941(m=2.45) | 0.03941(m=2.45) |
| 0.00052(m=2.73) | 0.00052(m=2.73) |

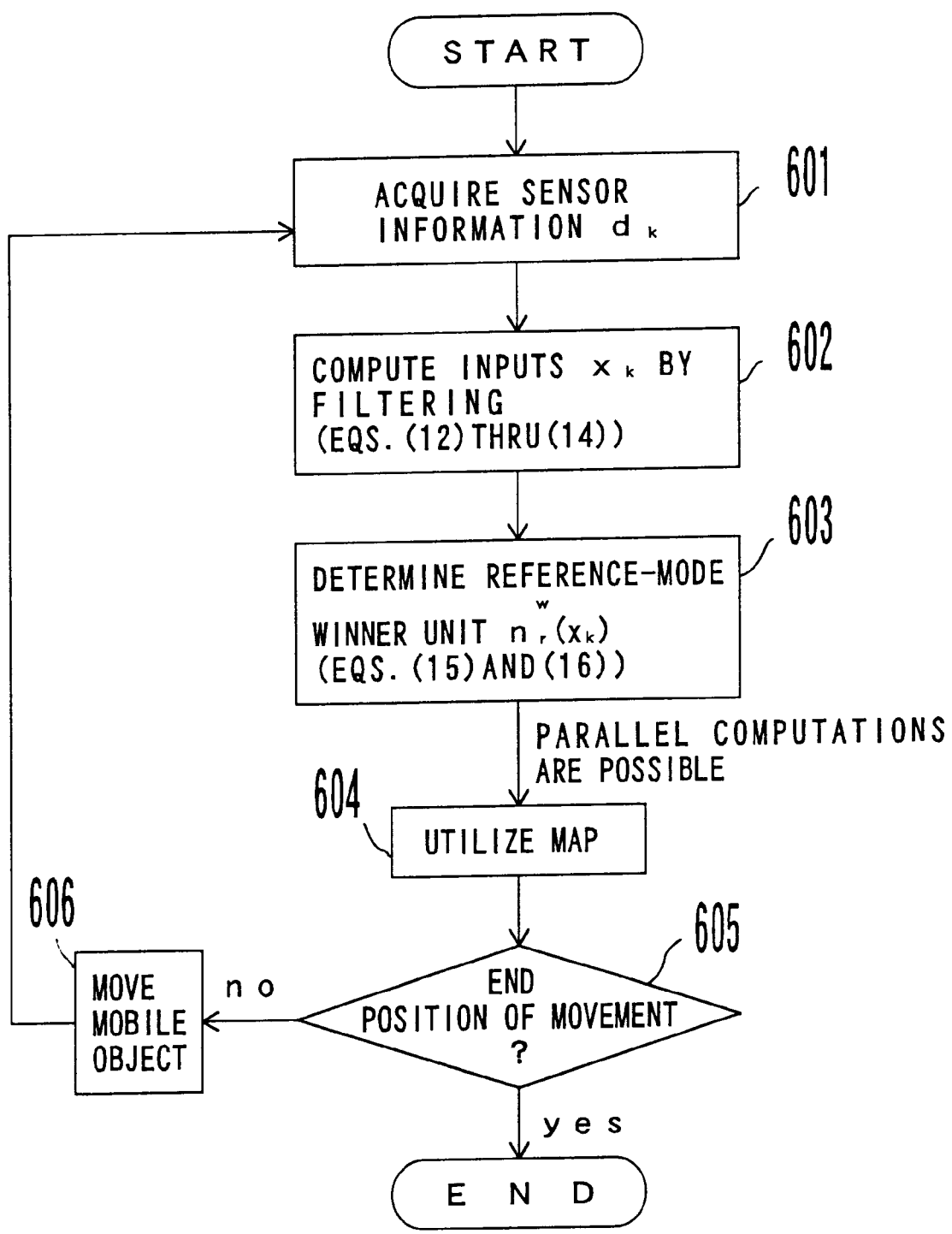
F I G. 6

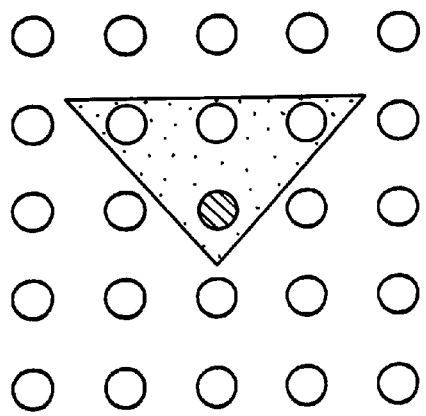
FIG. 10A  *dir1*
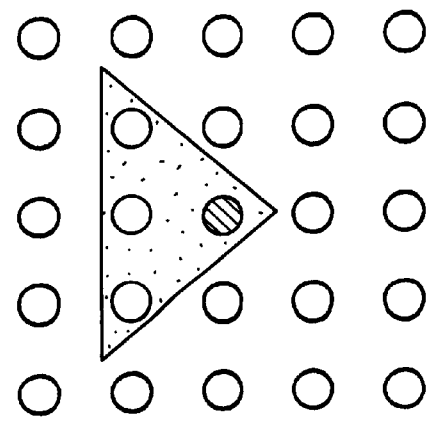
FIG. 10B  *dir2*
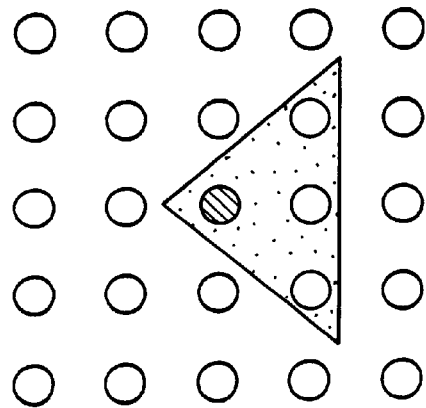
FIG. 10C  *dir3*
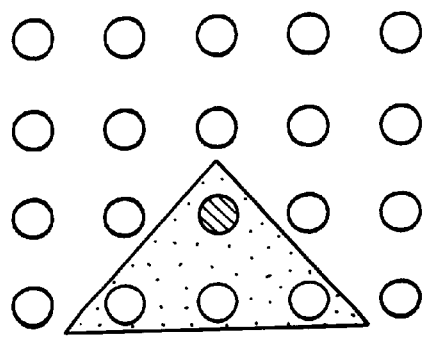
FIG. 10D  *dir4*

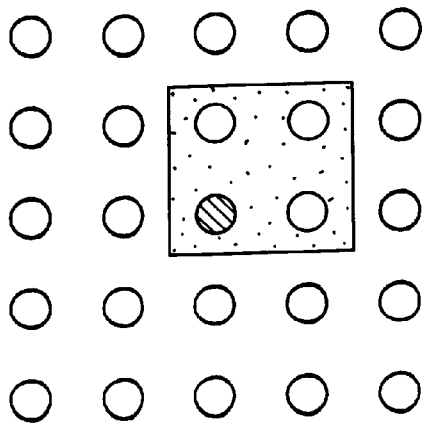
FIG. 11A *dir1*
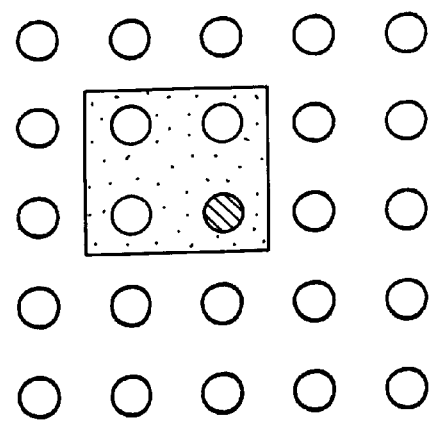
FIG. 11B *dir2*
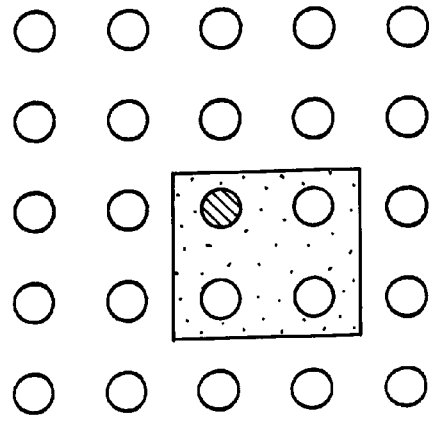
FIG. 11C *dir3*
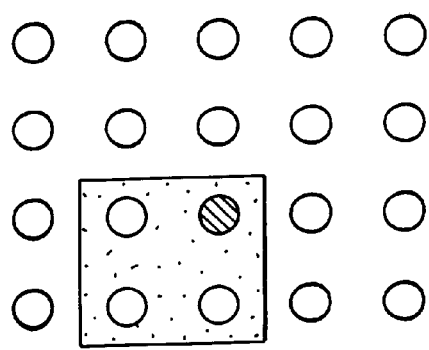
FIG. 11D *dir4*

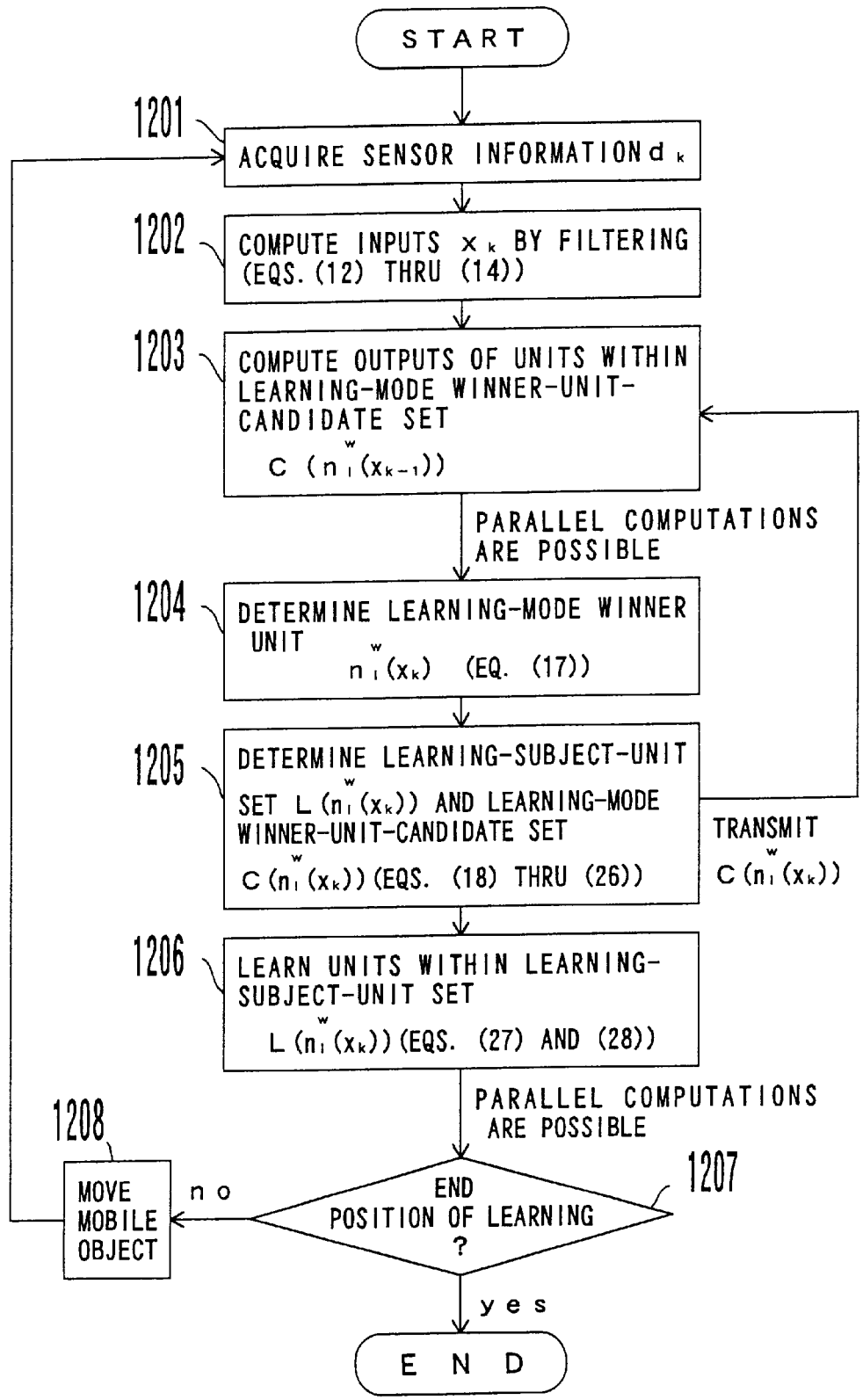
F I G. 1 2

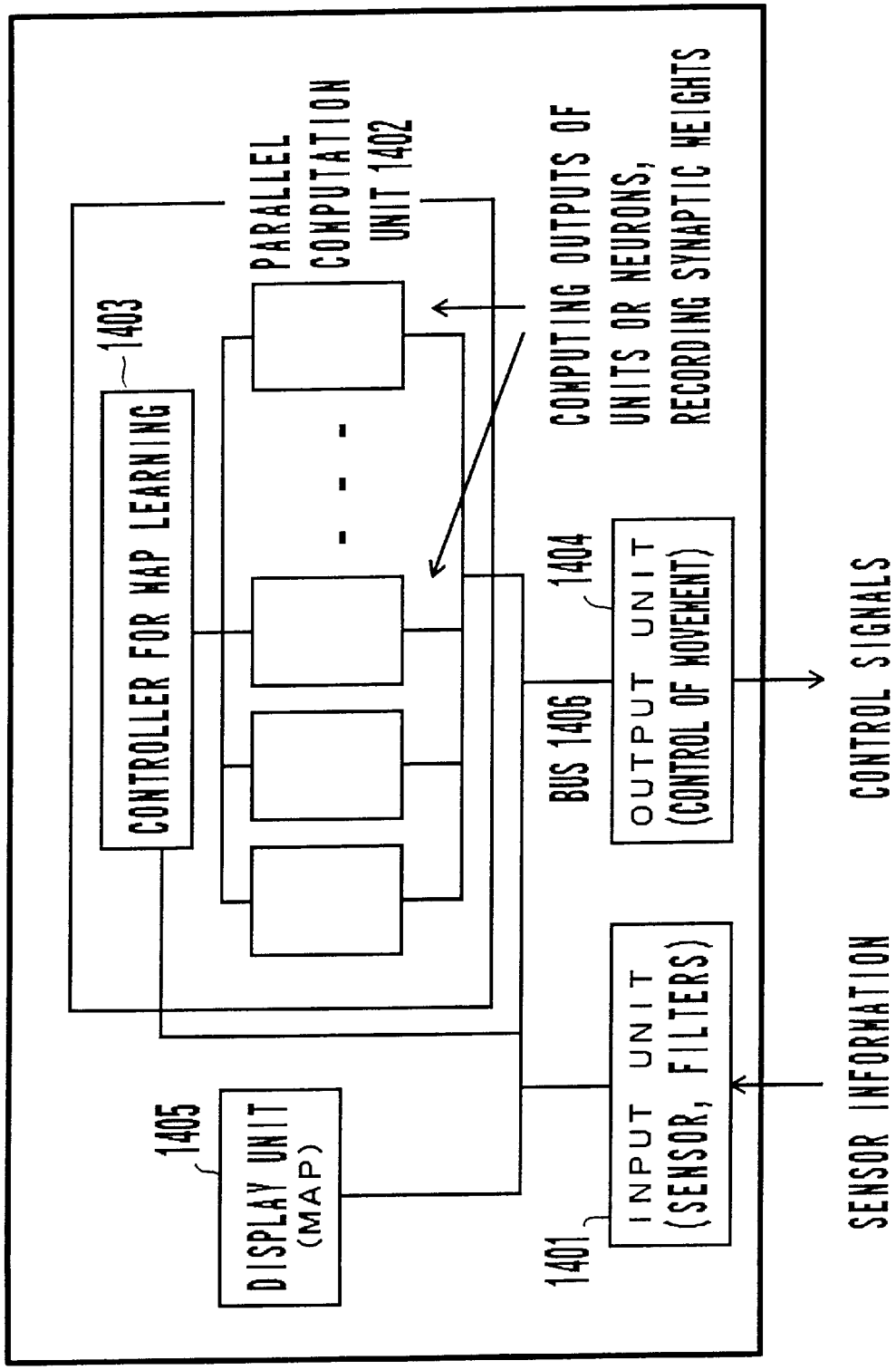
F I G. 1 4

FIG. 17

| y \ x | -1.0 | -0.9 | -0.8 | -0.7 | -0.6 | -0.5 | -0.4 | -0.3 | -0.2 | -0.1 | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|---|---|---|---|---|---|---|---|---|---|
| 1.0 | . | . | . | . | . | . | . | . | . | . | . | . | . | . | . | . | . | . | . | 13 | . |
| 0.9 | . | . | . | . | . | . | . | . | . | . | . | . | . | . | . | . | 29 | 29 | 29 | 13 | 13 | 13 | 46 | 46 | . |
| 0.8 | . | . | . | . | . | . | . | . | . | . | . | 0 | 0 | 29 | 29 | 29 | 29 | 13 | 46 | 46 | 46 | 46 | . |
| 0.7 | . | . | . | . | . | . | . | . | . | . | 0 | 0 | 0 | 47 | 46 | 46 | 46 | 46 | 46 | 46 | 46 | 46 | 48 | . |
| 0.6 | . | . | . | . | . | . | . | 17 | 17 | 29 | 0 | 0 | 46 | 46 | 46 | 46 | 46 | 46 | 8 | 8 | 8 | 48 | 48 | . |
| 0.5 | . | . | . | . | . | 33 | 33 | 17 | 39 | 0 | 46 | 46 | 46 | 29 | 29 | 8 | 8 | 8 | 8 | 19 | 48 | . |
| 0.4 | . | . | . | 19 | 30 | 33 | 21 | 21 | 39 | 0 | 0 | 47 | 47 | 8 | 8 | 8 | 8 | 32 | 32 | 40 | 40 | . |
| 0.3 | . | . | 19 | 19 | 33 | 32 | 32 | 1 | 1 | 1 | 1 | 8 | 8 | 8 | 8 | 32 | 32 | 40 | 40 | . |
| 0.2 | . | 19 | 19 | 32 | 32 | 32 | 43 | 1 | 1 | 1 | 8 | 8 | 2 | 43 | 32 | 19 | 19 | 26 | . |
| 0.1 | . | 19 | 19 | 11 | 32 | 32 | 43 | 43 | 25 | 32 | 32 | 10 | 43 | 43 | 43 | 6 | 19 | 42 | 42 | . |
| 0.0 | 42 | 42 | 19 | 35 | 7 | 4 | 4 | 4 | 32 | 32 | 10 | 10 | 43 | 43 | 43 | 6 | 6 | 42 | 42 | 42 | . |
| -0.1 | . | 42 | 33 | 35 | 7 | 35 | 4 | 4 | 4 | 45 | 45 | 43 | 43 | 44 | 6 | 42 | 42 | . |
| -0.2 | . | 33 | 33 | 11 | 7 | 41 | 4 | 4 | 4 | 45 | 45 | 35 | 13 | 13 | 44 | 44 | 42 | 42 | 42 | . |
| -0.3 | . | 33 | 27 | 7 | 41 | 41 | 41 | 26 | 26 | 45 | 35 | 13 | 13 | 13 | 42 | 42 | 42 | 40 | 27 | . |
| -0.4 | . | 27 | 27 | 27 | 41 | 41 | 41 | 26 | 26 | 45 | 45 | 35 | 13 | 13 | 13 | 42 | 42 | 42 | 18 | 27 | . |
| -0.5 | . | . | 27 | 27 | 25 | 41 | 0 | 0 | 26 | 45 | 9 | 9 | 13 | 13 | 42 | 42 | 18 | 18 | 18 | . |
| -0.6 | . | . | 27 | 27 | 44 | 25 | 25 | 0 | 45 | 9 | 9 | 9 | 9 | 14 | 18 | 18 | 18 | 40 | 18 | . |
| -0.7 | . | . | . | 9 | 9 | 25 | 25 | 4 | 45 | 9 | 9 | 14 | 14 | 18 | 18 | 23 | 23 | . |
| -0.8 | . | . | 9 | 9 | 9 | 4 | 45 | 9 | 9 | 14 | 14 | 14 | 22 | 18 | 18 | . |
| -0.9 | . | . | . | . | 10 | 10 | 8 | 34 | 14 | 14 | 14 | 14 | 22 | 22 | . |
| -1.0 | . | . | . | . | . | . | . | 43 | . | . | . | . | . |

TOPOLOGICAL MAP COMPUTATION SYSTEM AND METHOD IN WHICH THE CONTINUITY OF CHANGES IN INPUT PATTERNS IS CONSIDERED

BACKGROUND OF THE INVENTION

1. Field of the Invention

The present invention relates to the learning technology of a topological map which is employed in, for example, representing a map or chart for navigation of a mobile object adapted to move within an environment (or space), such as a mobile robot.

2. Description of the Related Art

A map or chart needs to be utilized for efficient navigation in, for example, the case where a mobile object moves from a certain position to another. Similarly, in fact, a person utilizes various maps in accordance with such purposes.

An ordinary map, to be used by a person, is formed by measuring such information items as bearings, distances, heights etc. with instruments. Information items, representing geographical features, roads etc. are then described on a medium such as paper with marks, so that many people can share and utilize the map.

On the other hand, each of many organisms, including humans, can acquire a cognitive map (or what is called a "good knowledge of a locality") in their brains, on the basis of learning by moving about within an environment. Whereas the so-called "ordinary map" is for general use by any person, the cognitive map an organism forms by the learning process is for individual use and is purpose-dependent.

In a case where a mobile object can form a map by learning, the following advantages are brought forth:

1) When the mobile object is situated in an unfamiliar environment and is not endowed with any existing map, it can form a map of the environment by learning by itself.

2) When an existing map is unsuitable for a certain purpose, the mobile object can learn a map suitable for this purpose.

3) The mobile object can form a more effective map based on the kinds of available sensors or receptors (by way of example, a map based on vision is useless to a mobile robot which has only an ultrasonic sensor).

Accordingly, it is a very important function that a map can be formed in a self-organized fashion by the learning process.

As regards methods of representing maps, there are ordinary maps (in which bearings, distances, heights etc. are represented in two dimensions by the use of marks), maps which utilize identification trees (or tree structures), maps which are represented using coordinates, and so on. In the present invention, maps or charts are specifically represented by utilizing the topological maps or topology preserving maps proposed by Teuvo Kohnen in the papers "Self-Organized Formation of Topologically Correct Feature Maps, Biological Cybernetics 43, 59–69, 1982", "The Self-Organizing Map, The Proceedings of IEEE, VOL. 78, NO. 9, 1464–1480, 1990", etc. The topological map is one model of a neural network. Neutral network have the feature that a "topology preserving map", in which a mutual similarity (in a phase structure) between input patterns is reflected in the positional relationship of firing neurons, can be formed by learning. Now, the topological map will be explained.

(A) Structure of a Topological Map

A topological map is a neural network which has a single-layer structure as illustrated in FIG. 1. The neural network is configured of N $(=N_1 \times N_2)$ units (or neurons) which are arranged in two dimensions. It is provided with vectors $x \in R^M$ as inputs. Here, the letter M denotes the number of dimensions of the inputs. Further, underlined symbols indicate vector quantities in the ensuing explanation. Since the ith unit receives sensor information through a synapse coupling vector (hereinafter, termed a "synaptic weight") $w_i \in R^M$ (i=1, . . . , N), the input $u_i$ to the unit 'i' is computed in accordance with the following equation:

$$u_i = \sum_{j=1}^{M} w_{i,j} x_j = \underline{w_i} \cdot \underline{x} \tag{1}$$

The outputs $y_i$ (i=1, . . . , N) of the neural network are determined so that, as indicated by the following equations (2) and (3), the unit 'c' having received the maximum input becomes a winner. Thus, only the winner unit fires (delivering an output "1 (one)"), whereas the remaining units do not fire (may deliver outputs "0's (zeros)"):

$$c = \{i : \underline{w_i} \cdot \underline{x} \geq \underline{w_j} \cdot \underline{x}, \text{ for all } j\} \tag{2}$$

$$y_i = \begin{cases} 1, & \text{for } i = c \text{ (winner unit)} \\ 0, & \text{for } i \neq c \end{cases} \tag{3}$$

When the inputs x and the synaptic weights $w_i$ are normalized to unit vectors, the winner unit can also be determined as the unit 'c' which has the synaptic weight $w_i$ closest to (or most resembling) the input x, as indicated by an equation (4) given below. In the following explanation, it will be assumed for the sake of brevity that both the inputs x and the synaptic weights $w_i$ are normalized to be unit vectors.

$$c = \{i : \|\underline{x} - \underline{w_i}\| \leq \|\underline{x} - \underline{w_j}\|, \text{ for all } j\} \tag{4}$$

(B) Learning Rule

In the learning technology of a topological map, learning proceeds through receipt of inputs x corresponding respectively to patterns close to each other in a certain environment or space. When such inputs have been received, units or neurons similarly close to each other on the topological map fire.

In the learning process, the variation $\Delta w_i$ of the synaptic weight $w_i$ is computed in accordance with the following equation (5):

$$\Delta \underline{w_i} = \begin{cases} \eta(\underline{x} - \underline{w_i}), & \text{for } i \in L(c) \\ 0, & \text{for } i \notin L(c) \end{cases} \tag{5}$$

Here, symbol η denotes a positive constant for determining the rate of learning, and the symbol L(c) denotes the set of units around the winner unit "c" (or in the vicinity of the winner unit). Eq. (5) indicates that only the synaptic weights $w_i$ of the winner unit "c" satisfying Eq. (4), and the units belonging to the surrounding set L(c), are altered by the learning process. The synaptic weights $w_i$ of the other units are not changed. It is generally considered favorable to set a larger value for the constant η and a wider range for the set L(c) at the initial stage of the learning process, and to gradually decrease the value of the constant η and narrow the range of the set L(c) as the learning process proceeds.

(C) Property and Fields of Application

A learning process based on the learning rule, explained in the item (B) above, enables a topological map having the structure explained in the item (A) above to obtain a map in which the similarity of the inputs x is reflected in the vicinity or closeness of the positions of the firing winner units "c". That is, a map is obtained in which the topology (phase structure) of the inputs is preserved.

Using this property, topological maps have been applied various fields including, for example, the sorting of inputs, motion controls, speech recognition, vector quantization, and combination optimizing problems. The self-organized formation of a map or chart based on learning, toward which the preferred embodiments of the present invention to be described later are directed, is one of the applications of the sorting of the inputs x. More specifically, in each of the preferred embodiments, a topological map serving as a map or chart in which a position within any desired environment or space is specified on the basis of the inputs x from any position detecting sensor, can be realized by utilizing the property that, when the inputs x indicate positions within the space, the individual inputs x corresponding respectively to positions close to each other within the space are mapped as the winner units "c" similarly close to each other on the learnt topological map. This operation is just correspondent to the action of a person in which he/she specifies his/her current position on the basis of visual information obtained by eye.

The learning rule of the topological map in the prior art as explained in the item (B) is assumed on the condition that the inputs (or input vectors) x are selected from within an input space X at random or in accordance with a certain probability distribution. Here, in a case where the information items of the environment or space are measured by sensors while a mobile object is moving within the environment, and where a map or chart is to be formed from the obtained sensor information, the input information items from the sensors are not taken at random, but they are taken along the moving path of the mobile object. Nevertheless, the learning rule in the prior art is general and does not make use of a nature peculiar to the field of application. It is therefore impossible to utilize the fact that the inputs x are taken along the moving path, in other words, motion information.

For this reason, the prior-art learning rule has the problems that the learning constant $\eta$ and the learning range $L(c)$ needs to be properly regulated in accordance with the number of times of learning, and a long time period is expended on the learning. Further, the prior-art learning rule has the problem that the learning sometimes fails to proceed successfully, so a map or chart based on the formed topological map falls into a so-called "distorted" state.

SUMMARY OF THE INVENTION

This invention has been made with the background stated above, and has for its object to realize the efficient learning of a topological map by utilizing motion information items (for example, the continuity of movements and the direction of the movement) together with sensor information items which are collected in such a way that a mobile object, for example, mobile robot, moves about within an environment.

The present invention is assumed on a computation system for a topological map having N units arranged in two dimensions, wherein when an input vector has been given, inputs to the individual units are respectively determined as summations of products between components of the input vector and components of synaptic weight vectors, and wherein only a winner unit, being the unit which has received a maximum one of the inputs to the individual units, is determined so as to fire.

The computation system comprises a winner-unit-candidate-set calculation module for calculating a winner unit candidate set which is a set of candidates for the winner unit corresponding to the input vector at a current input timing; and a winner-unit calculation module for calculating said winner unit which corresponds to said input vector at the current input timing, as the unit which has received a maximum input among the units contained in the winner unit candidate set calculated by the winner-unit-candidate-set calculation module.

According to the present invention, in a case where the winner unit is to be found on the topological map in a learning mode or a reference mode, a calculational range for finding the winner unit is limited as the winner unit candidate set beforehand. Thus, it is possible to find the winner unit efficiently and accurately.

Besides, in the present invention, the winner unit candidate set is determined on the basis of the winner unit calculated at a past input timing (for example, a last input timing) near the current input timing, or on the basis of the winner unit at the past input timing and the directional change of the input vector at the current input timing. Thus, the state of change in the input vectors can be reflected in the calculation process of the winner unit, and it is possible to find the winner unit efficiently and accurately in accordance with the nature of the input vectors.

Moreover, in a case where the present invention is applied to the learning mode of the topological map and where the topological map is used as a map for navigating the moving path of a mobile object within an environment, information items on the moving path and moving direction of the mobile object are reflected in the winner unit candidate set. Therefore, the winner unit during learning can be determined under restricted conditions based on the moving path and moving direction of the mobile object, and the learning is possible to proceed efficiently and accurately.

Further, in a case where the present invention is applied to the learning mode of the topological map, the information items on the moving path and moving direction of the mobile object can be reflected in the determination of the set of the units to-be-learnt, the synaptic weight vectors of which are to be updated, and the learning is similarly possible to proceed efficiently and accurately.

In addition, in a case where the present invention is applied to the reference mode of the topological map and where the topological map is used as a map for navigating the moving path of a mobile object within an environment, information items on the moving path and moving direction of the mobile object are reflected in the winner unit candidate set. Therefore, the winner unit during reference can be determined under restricted conditions based on the moving path and moving direction of the mobile object, and the reference is possible to proceed efficiently and accurately.

BRIEF DESCRIPTION OF THE DRAWINGS

The other objects and features of the present invention will be readily understood by one skilled in the art from the description of the preferred embodiments of the invention when read in conjunction with the accompanying drawings, wherein:

FIG. 3 is a block diagram of a map learning system in a preferred embodiment of the present invention;

FIGS. 5A and 5B are diagrams for explaining a sensor information processor which is included in the preferred embodiment;

FIG. 6 is a flowchart of an operation in a map reference mode;

FIGS. 10A, 10B, 10C and 10D are diagrams showing a setting example #4 for the sets $C(n^w)$ and $L(n^w)$;

FIGS. 11A, 11B, 11C and 11D are diagrams showing a setting example #5 for the sets $C(n^w)$ and $L(n^w)$;

FIG. 12 is a flowchart of an operation in a map learning mode;

FIG. 14 is a schematic diagram showing an example of a hardware architecture in the preferred embodiment;

FIG. 17 is a diagram showing the state of a map before learning (the arrangement of winner units);

DESCRIPTION OF THE PREFERRED EMBODIMENTS

Next, the preferred embodiments of the present invention will be described in detail with reference to the drawings.
Explanation of the Principle of the Preferred Embodiments The principle of the present invention will be explained first before the detailed description of the preferred embodiments based on the present invention.

Figure 1:
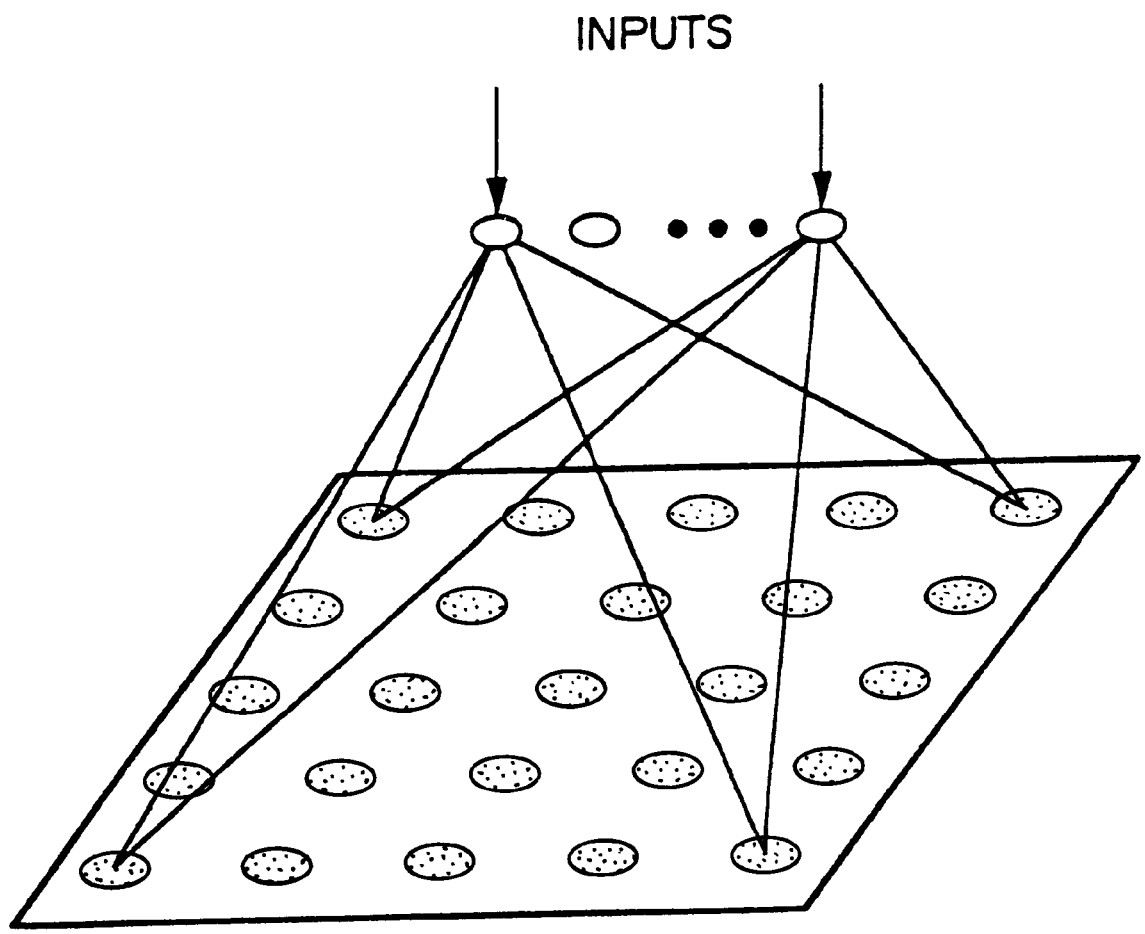
FIG. 1 is a diagram of a model for explaining the construction of a topological map.
Figure 2:
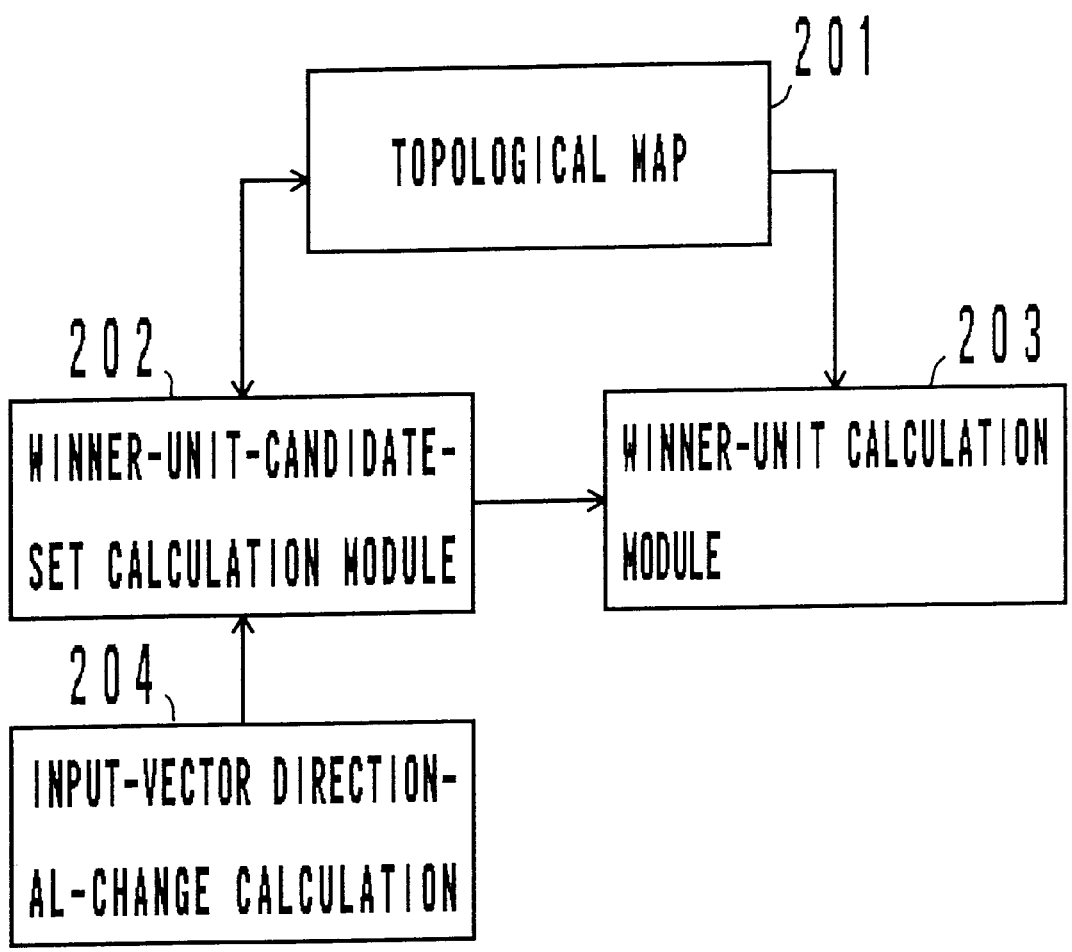
FIG. 2 is a block diagram showing the principle of the present invention.

FIG. 2 is a block diagram showing the principle of the present invention. The present invention is assumed on a computation system/method for a topological map 201 having N units arranged in two dimensions, wherein when an input vector has been given, inputs to the individual units are respectively determined as the summations of the products between the components of the input vector and the components of synaptic weight vectors, and wherein only a winner unit being the unit which has received the maximum input to the individual units is determined to fire.

First, a winner-unit-candidate-set calculation module 202 calculates a winner unit candidate set which is the set of candidates for the winner unit corresponding to the input vector at the current input timing.

Subsequently, a winner-unit calculation module 203 calculates the winner unit which corresponds to the input vector at the current input timing, as the unit which has received the maximum input among the units contained in the winner unit candidate set calculated by the winner-unit-candidate-set calculation module 202.

In this manner, according to the present invention, in the case where the winner unit is to be found on the topological map 201 in a learning mode or a reference mode, a calculational range for finding the winner unit is limited as the winner unit candidate set beforehand. Thus, it is permitted to find the winner unit efficiently and accurately.

In the above construction of the present invention, the winner-unit-candidate-set calculation module 202 can be configured so as to calculate the winner unit candidate set on the basis of the winner unit calculated at a past input timing near the current input timing.

Alternatively, in the above construction of the present invention, an input-vector directional-change calculation module 204 can be further included for calculating the directional change of the input vector at the current input timing, and the winner-unit-candidate-set calculation module 202 can be configured so as to calculate the winner unit candidate set on the basis of the winner unit at the past input timing near the current input timing and the directional change of the input vector at the current input timing as calculated by the input-vector directional-change calculation module 204.

In this manner, the winner unit candidate set is determined on the basis of the winner unit calculated at the past input timing (for example, the last input timing) near the current input timing, or on the basis of both the winner unit at the past input timing and the directional change of the input vector at the current input timing as calculated by the input-vector directional-change calculation module 204. Thus, the state of change in the input vectors can be reflected in the calculation process of the winner unit, and it is assumed to find the winner unit efficiently and accurately in accordance with the nature of the input vectors.

Here, the construction may be such that the winner unit is calculated for a learning process which updates the synaptic weight vectors of the respective units of the topological map 201. In other words, the present invention can be constructed so as to be applied to the learning mode of the topological map 201.

Further, in this case, the construction can be so configured that the topological map 201 is used as a map or chart for navigating the moving path of a mobile object within an environment, and that the input vector corresponds to sensor information indicating the position of the mobile object within the environment.

In this manner, in the case where the present invention is applied to the learning mode of the topological map 201 and where the topological map 201 is used as the map or chart for navigating the moving path of the mobile object within the environment, information items on the moving path and the moving direction of the mobile object are reflected in the winner unit candidate set. Therefore, the winner unit during the learning process can be determined under restricted conditions based on the moving path and moving direction of the mobile object, and the learning process is possible to proceed efficiently and accurately.

There will now be explained a more practicable construction for the above case where the present invention is applied to the learning mode of the topological map 201 and where the topological map 201 is used as the map or chart for navigating the moving path of the mobile object within the environment.

The winner-unit-candidate-set calculation module 202 calculates the winner unit candidate set $C(n^w)$ satisfying the following equation (6) or (7) where symbol ($i_{nw}$, $j_{nw}$) denotes the position of the winner unit found at the last input timing with respect to the current input timing, while symbol ($i_n$, $j_n$) denotes the positions of the individual units contained in the winner unit candidate set $C(n^w)$:

$$C(n^w) = \{n:(i_n, j_n), |i_n - i_{nw}| \leq 1, |j_n - j_{nw}| \leq 1\} \quad (6)$$

$$C(n^w) = \{n:(i_{nw}, j_{nw}), (i_{nw}-1, j_{nw}), (i_{nw}+1, j_{nw}) (i_{nw}, j_{nw}-1), (i_{nw}, j_{nw}+1), \} \quad (7)$$

As an alternative measure, the input-vector directional-change calculation module 204 calculates the directional change of the input vector at the current input timing, as any of four directions "dir1", "dir2", "dir3" and "dir4" satisfying the following equation (8) or (10), and the winner-unit-candidate-set calculation module 202 calculates the winner unit candidate set $C(n^w)$ satisfying the following equation (9) (when Eq. (8) is utilized) or equation (11) (when Eq. (10) is utilized) where symbol ($i_{nw}$, $j_{nw}$) denotes the position of the winner unit found at the last input timing with respect to the current input timing, in accordance with the directional change of the input vector at the current input timing as calculated by the input-vector directional-change calculation module 204:

$$\text{dir } 1 = [45°, 135°]$$

$$\text{dir } 2 = [135°, 225°]$$

$$\text{dir } 3 = [225°, 315°]$$

$$\text{dir } 4 = [-45°, 45°] \quad (8)$$

$$C(n^w) = \begin{cases} \{n:(i_{nw}, j_{nw}), (i_{nw}-1, j_{nw}-1), \\ \quad (i_{nw}-1, j_{nw}), (i_{nw}-1, j_{nw}+1),\}, & \text{if } dir\ 1 \\ \{n:(i_{nw}, j_{nw}), (i_{nw}-1, j_{nw}-1), \\ \quad (i_{nw}, j_{nw}-1), (i_{nw}+1, j_{nw}-1),\}, & \text{if } dir\ 2 \\ \{n:(i_{nw}, j_{nw}), (i_{nw}+1, j_{nw}-1), \\ \quad (i_{nw}+1, j_{nw}), (i_{nw}+1, j_{nw}+1),\}, & \text{if } dir\ 3 \\ \{n:(i_{nw}, j_{nw}), (i_{nw}-1, j_{nw}+1), \\ \quad (i_{nw}, j_{nw}+1), (i_{nw}+1, j_{nw}+1),\}, & \text{if } dir\ 4 \end{cases} \quad (9)$$

$$\text{dir } 1 = [0°, 90°]$$

$$\text{dir } 2 = [90°, 180°]$$

$$\text{dir } 3 = [180°, 270°]$$

$$\text{dir } 4 = [270°, 360°] \quad (10)$$

$$C(n^w) = \begin{cases} \{n:(i_{nw}, j_{nw}), (i_{nw}-1, j_{nw}), \\ \quad (i_{nw}-1, j_{nw}+1), (i_{nw}, j_{nw}+1),\}, & \text{if } dir\ 1 \\ \{n:(i_{nw}, j_{nw}), (i_{nw}-1, j_{nw}-1), \\ \quad (i_{nw}-1, j_{nw}), (i_{nw}, j_{nw}-1),\}, & \text{if } dir\ 2 \\ \{n:(i_{nw}, j_{nw}), (i_{nw}, j_{nw}-1), \\ \quad (i_{nw}+1, j_{nw}-1), (i_{nw}+1, j_{nw}),\}, & \text{if } dir\ 3 \\ \{n:(i_{nw}, j_{nw}), (i_{nw}, j_{nw}+1), \\ \quad (i_{nw}+1, j_{nw}), (i_{nw}+1, j_{nw}+1),\}, & \text{if } dir\ 4 \end{cases} \quad (11)$$

Further, in the case where the present invention is applied to the learning mode of the topological map 201 as stated above, the computation system can be constructed so as to further include a learning-subject-unit-set calculation module by which a learning-subject-unit set being the set of the units to have their synaptic weight vectors updated is calculated on the basis of the winner unit obtained with the winner-unit calculation module 203 and the directional change of the input vector at the current input timing as obtained with the input-vector directional-change calculation module 204, and a synaptic-weight-vector updating module by which the units contained in the learning-subject-unit set calculated by the learning-subject-unit-set calculation module are subjected to a learning process for updating the synaptic weight vectors.

In this manner, in the case of applying the present invention to the learning mode of the topological map 201, the information items on the moving path and moving direction of the mobile object are reflected in the determination of the learning-subject-unit set of which the synaptic weight vectors are to be updated. Thus, the learning is similarly possible to proceed efficiently and accurately.

Meanwhile, the computation system of the present invention can be so configured that the winner unit is calculated for the reference process of the topological map 201. In other words, the present invention can be constructed so as to be applied also to the reference mode of the topological map 201.

Further, in this case, the construction of the present invention can be so contrived that the topological map 201 is used as a map or chart for navigating the moving path of a mobile object within an environment.

In this manner, in the case where the present invention is applied to the reference mode of the topological map 201 and where the topological map 201 is used as the map or chart for navigating the moving path of the mobile object within the environment, information items on the moving path and moving direction of the mobile object are reflected in the winner unit candidate set. Therefore, the winner unit during the reference process can be determined under restricted conditions based on the moving path and moving direction of the mobile object, and the reference process is possible to proceed efficiently and accurately.

Incidentally, the present invention can also be constructed in the form of a method which realizes the same functions as those of the system so far described.

DETAILED DESCRIPTION OF THE PREFERRED EMBODIMENTS

The preferred embodiments of the present invention based on the above principle will now be described in detail with reference to the drawings.

In a case where the information items of an environment or a space are measured by sensors while a mobile object is moving within the environment and where a map or chart is formed on the basis of learning process by inputting the obtained sensor information items to a topological map, the sensor inputs x are not taken at random, but they are afforded along the moving path of the mobile object. One of the preferred embodiments is therefore characterized by the learning of the topological map utilizing the fact that the inputs x are afforded along the moving path, in other words, motion information. Here, the term "motion information" shall signify the following:

1) Information on the Continuity of Movement: Information indicative of the nature that the movement of the mobile object is continuous from a certain position to a position adjacent thereto.

2) Moving Direction: Information indicative of the direction in which the mobile object moves subsequently to its current position.

In this preferred embodiment, the selection of a winner unit and the setting of a learning range during the learning process are done by utilizing the motion information items, so that the learning process is made efficient.

FIG. 3 is a block diagram showing a map learning system in this preferred embodiment. The map learning system is constructed of a sensor array 301, a movement control device 302, a sensor information processor 303, a map representation device 304, a learning adjustment device 305 and a learning execution device 306. Accordingly, the map learning system is adapted to operate in the two operation modes of a map learning mode and a map reference mode. In the map learning mode, the mobile object carrying the map learning system thereon moves about within the environment and gathers the environmental information, thereby to learn the map of the environment. On the other hand, in the map reference mode, the learnt map is utilized for navigation etc.

Explanation of Terms and Symbols

Terms and symbols to be used in the ensuing description will be defined before describing the details of the map learning system shown in FIG. 3.

$n$ ($1 \leq n \leq N$): Nos. of N ($=N_1 \times N_2$) units which constitute a topological map.

$k$ ($1 \leq k \leq K$): Nos. of learning positions which lie along a moving path. Each of the positions is determined along the moving path at every predetermined time interval or every predetermined movement distance, or each time sensor information changes by or above a predetermined threshold value.

$d_k$: Sensor information vector which is measured by the sensor array 301 at a position "k".

$x_k$: Input vector which is processed by the sensor information processor 303 and then entered into the topological map at the position "k".

Reference-mode winner unit: Winner unit in a map reference mode.

Learning-mode winner unit: Winner unit in a map learning mode.

$n^w_r(x_k)$: No. of the reference-mode winner unit for inputs $x_k$ at the position "k" which lies along the moving path. The winner unit shall be also called the "reference-mode winner unit $n^w_r(x_k)$".

$n^w_l(x_k)$: No. of the learning-mode winner unit for inputs $x_k$ at the position "k" which lies along the moving path. The winner unit shall be also called the "learning-mode winner unit $n^w_l(x_k)$".

$L(n^w_l(x_k))$: Set of units whose synaptic weights are altered around the learning-mode winner unit $n^w_l(x_k)$ at the current position "k" lying along the moving path (learning-subject-unit set). The set shall be also called the "set $L(n^w)$".

$C(n^w_l(x_{k-1}))$: Set of units which are candidates for the learning-mode winner unit $n^w_l(x_k)$ at the current position "k" when the learning-mode winner unit at the last position "k−1" lying along the moving path is denoted by $n^w_l(x_{k-1})$ (learning-mode-winner-unit candidate set). The set shall be also called the "set $C(")$".

$(i_n, j_n)$: Position of the unit No. "n" on the topological map.

$(i_{nw}, j_{nw})$: Position of the winner unit No. "n" on the topological map.

Next, the details of the constituent parts of the map learning system shown in FIG. 3 will be described.

Environment and Mobile Robot

Figure 4:
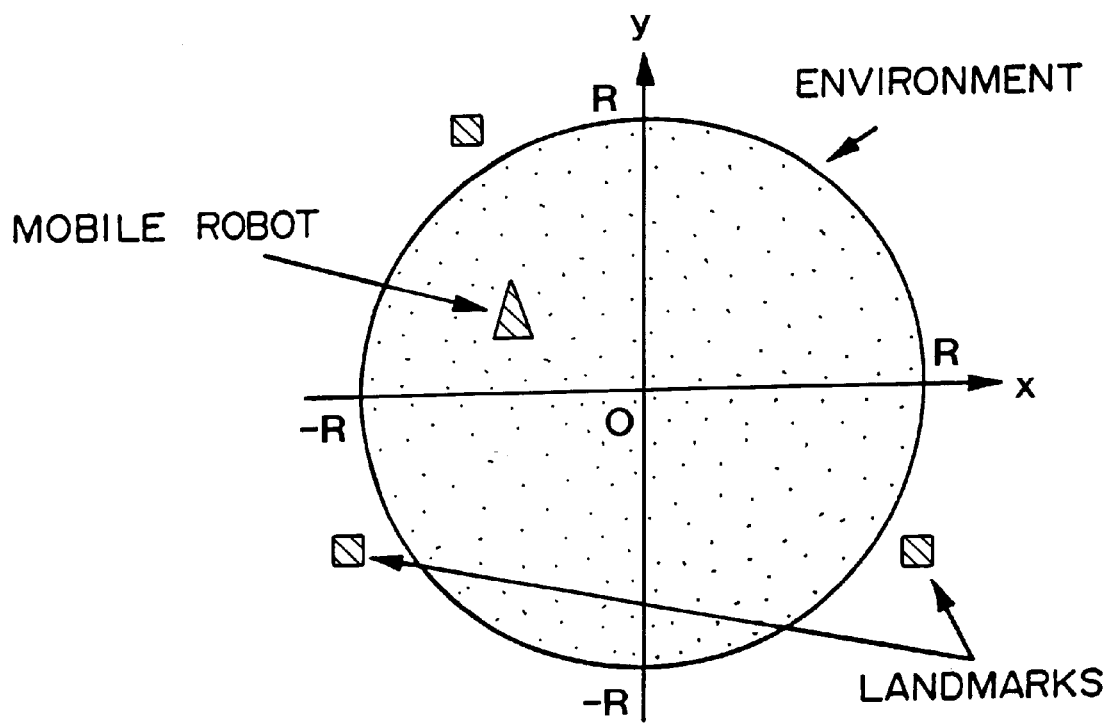
FIG. 4 is a diagram showing a mobile robot and a circular environment.

A circular environment on a plane as illustrated in FIG. 4 is assumed by way of an example of the environment (moving limits) where the mobile robot, in which the map learning system in FIG. 3 is carried, moves about. The circular environment is centered on the origin of an x-y coordinate system defined on the plane, and it has a radius R. The environment is assumed capable of including M landmarks.

Explanation of Sensor Array 301

The sensor array 301 collects information from the environment by utilizing many sorts of sensors, at each position at which the mobile object has arrived by moving within the environment. Also, the sensor array 301 collects information, such as a movement distance, a moving direction and consumed energy, from the movement control device 302. Sensor information items $d_k$ expressive of the collected information are transferred to the sensor information processor 303.

More concretely, in the example of FIG. 4, the mobile robot is furnished with sensors which can measure distances from the M landmarks, and which measure the distances $d_k=(d_k^{(1)}, d_k^{(2)}, \ldots, d_k^{(m)}, \ldots, d_k^{(M)})$ (where $1 \leq k \leq K$) from the landmarks, at the position "k" lying along the moving path. Here, symbol $d_k^{(m)}$ denotes the distance from the position "k" to the landmark "m".

Explanation of Movement Control Device 302

The movement control device 302 moves the mobile object by controlling a driver such as an electric motor, etc. In the map learning mode, the movement control device 302 fulfills such functions as subjecting the mobile object to random excursions, moving it to a new place and altering its moving direction at the boundary of the environment, in order that the mobile object may move about within the environment. In the map reference mode which proceeds after the end of the learning of the map of the environment, the movement control device 302 fulfills the function of performing the navigation through the utilization of the map represented by the map representation device 304, whereby the mobile object is efficiently moved within the environment.

In addition, the movement control device 302 transfers the moving direction of the mobile object to the sensor array 301 at the position "k" lying along the moving path.

Sensor Information Processor 303

The sensor information processor 303 normalizes the sensor information $d_k$ collected by the sensor array 301, and converts the normalized data into the form $x_k$ suited as the inputs to the topological map of the map representation device 304. Further, the processor 303 receives the motion information data (such as the moving direction) through the sensor array 301 from the movement control device 302, and it transfers them to the learning adjustment device 305.

More concretely, the sensor information processor 303 converts the sensor information $d_k$ into the inputs $x_k$ in accordance with equations (12) thru (14) given below.

First of all, the computations of band-pass filters (each being a kind of Gaussian filter) as indicated by the following equation (12) are executed for each of the components $d_k^{(m)}$ ($1 \leq m \leq M$) of the sensor information $d_k$:

$$x_{k,j}^{(m)} = g(d_k^{(m)}; \mu_j^{(m)}, \sigma^{(m)}) = \exp\left(-\frac{(d_k^{(m)} - \mu_j^{(m)})^2}{(\sigma^{(m)})^2}\right) \quad (12)$$

Here, symbols $\mu_j^{(m)}$ and $\sigma^{(m)}$ ($1 \leq j \leq G$) denote the parameters of the filters (the average and variance of the Gaussian filters) for the distances $d_k^{(m)}$ from the landmark "m", respectively, and symbol G denotes the number of the filters computed for the distances $d_k^{(m)}$. The values of the parameters $\mu_j^{(m)}$ and $\sigma^{(m)}$ are set on the basis of the following equations (13) from the maximum distance $\max^{(m)}$ and minimum distance $\min^{(m)}$ between the mobile robot and the landmark "m":

$$\mu_j^{(m)} = \frac{\max^{(m)} - \min^{(m)}}{G} \cdot j, \quad \sigma^{(m)} = \frac{\max^{(m)} - \min^{(m)}}{G} \quad (13)$$

Subsequently, the input vector $x_k$ is calculated in such a way that the computed results of Eq. (12) for each of the components $d_k^{(m)}$ ($1 \leq m \leq M$) of the sensor information $d_k$ are combined into a single vector and are thus normalized on the basis of the following equation (14):

$$x_k = \frac{(x_{k,1}^{(1)} \ldots x_{k,G}^{(1)}, x_{k,1}^{(2)} \ldots x_{k,G}^{(2)}, x_{k,1}^{(M)} \ldots x_{k,G}^{(M)})}{\sqrt{\sum_{m=1}^{M}\sum_{j=1}^{M}(x_{k,j}^{(m)})^2}} \quad (14)$$

The denominator of the right-hand side of the above equation (14) is a term for normalizing a vector obtained as the numerator thereof, into unit vectors. The resulting inputs $x_k$ are entered into the topological map which corresponds to the map representation device 304 in FIG. 3.

It is now assumed by way of example that the sensors be in the number of two, and that sensor information data $d_1 = (1.0, 0.0)$ and $d_2 = (2.0, 0.0)$ have been obtained in two places. If these values are simply normalized (in other words, converted into unit vectors), both of them become $(2^{1/2}, 2^{1/2})$, and they cannot be distinguished. Therefore, each of the components of the sensor information $d_k$ (k=1, 2) is subjected to the computations of the band-pass filters indicated by Eq. (12), and the computed results are used for the vectorization and normalization based on Eq. (14). Here, let it be assumed that the Gaussian filtering operations of G=11 be executed for each of the components of the sensor information $d_k$ (k=1, 2), and that $\mu_j^{(m)} = \sigma^{(m)} = 0.27$ ($1 \leq j \leq G$, m=1, 2) applies in this case. Then, the sensor information items $d_1$ and $d_2$ are respectively converted into inputs $x_1$ and $x_2$ having components as indicated in FIG. 5A and FIG. 5B, by the computations of Eqs. (12) and (14). Incidentally, inputs $x_k$=(11 values of the first component, 11 values of the second component) (k=1, 2) apply on this occasion. It is understood from FIGS. 5A and 5B that the sensor information items $d_1$ and $d_2$ are respectively converted into the inputs $x_1$ and $x_2$ in forms distinguishable from each other, by the computations indicated by Eqs. (12) and (14). Moreover, these computations have the merit that the maximum value of the input to each unit or neuron of the topological map can be suppressed to be within a certain range.

Explanation of Map Representation Device 304

Next, the map representation device 304 in FIG. 3 is supplied with the inputs $x_k$ produced from the sensor information $d_k$ in the above way by the sensor information processor 303, so as to represent the map of the environment by the use of the topological map. Here, the topological map has the N ($=N_1 \times N_2$) units or neurons arranged in a latticed pattern (refer to FIG. 15, to be explained later).

In the map reference mode, the map representation device 304 enters the inputs $x_k$ ($1 \leq k \leq K$) calculated from the sensor information $d_k$ at the positions "k" lying along the moving path of the mobile object, into the respectively corresponding units of the topological map through synaptic weights $w_n \in R^{M*G}$ (refer to Eq. (14)). Subsequently, the map representation device 304 calculates a reference-mode winner unit $n^w_r(x_k)$ and the outputs $y_n$ corresponding to the inputs $x_k$, on the topological map in accordance with the following equations (15) and (16):

$$n_r^w(x_k) = \{n : \|x_k - w_n\| \leq \|x_k - w_i\|, \text{ for all } i\} \quad (15)$$

$$y_u = \begin{cases} 1, & \text{for } n = n_r^w(x_k) \text{ (winner unit)} \\ 0, & \text{for } n \neq n_r^w(x_k) \end{cases} \quad (16)$$

FIG. 6 is a flowchart showing the operation of the map learning system shown in FIG. 3, in the map reference mode.

First, the sensor array 301 acquires the sensor information $d_k$ at the current movement position "k" (step 601 in FIG. 6).

Secondly, the sensor information processor 303 computes the inputs $x_k$ corresponding to the sensor information $d_k$ at the current movement position "k", in accordance with Eqs. (12)–(14) (step 602 in FIG. 6).

Subsequently, the map representation device 304 calculates the reference-mode winner unit $n^w_r(x_k)$ and the outputs $y_n$ at the movement position "k", in accordance with Eqs. (15) and (16) (step 603 in FIG. 6). Incidentally, these calculations can be effected by parallel computations, as will be explained later in conjunction with FIG. 14.

The movement control device 302, etc. determines the current position within the environment on the basis of the outputs $y_n$ calculated by the map representation device 304, and realizes actions programmed beforehand (utilization of the map: step 604 in FIG. 6).

Further, the movement control device 302 decides whether or not the current position "k" is the final or end position of the movement (step 605 in FIG. 6). Subject to the decision that the current position "k" is not final, the movement control device 302 performs a movement control toward the next position "k+1" (along steps 605→606→601 in FIG. 6), and subject to the decision that the position "k" is final, the movement control device 302 ends the movement control of the current cycle.

Explanation of Learning Adjustment Device 305

The learning adjustment device 305 operates in the map learning mode so as to determine the learning-mode winner unit $n^w_1(x_k)$ at the current position "k" by use of the inputs $x_k$ which the sensor information processor 303 has calculated on the basis of the sensor information $d_k$ acquired from the sensor array 301.

On this occasion, as a feature relevant to the present invention, the learning adjustment device 305 calculates the learning-mode winner unit $n^w_1(x_k)$ at the current position "k" only from within the range of a learning-mode-winner-unit candidate set $C(n^w{}_1(x_{k-1}))$ obtained by processing at the last position "k−1" lying along the moving path, as indicated by the second formula in equation (17) given below. Incidentally, for k=1 (start position), the learning adjustment device 305 calculates the learning-mode winner unit $n^w{}_1(x_k)$ at the head position k=1 from within the whole range of the environment, as indicated by the first formula of the equation (17).

$$n_l^w(x_k) = \{n : \underline{w}_n \cdot x_k \geq \underline{w}_i \cdot x_k, \text{ for all } i\}, (k = 1) \quad (17)$$

$$n_l^w(\underline{x}_k) = \{n : \underline{w}_n \cdot x_k \geq \underline{w}_l \cdot \underline{x}_k, i \in C(n_l^w(\underline{x}_{k-1}))\},$$

$$(2 \leq k \leq K)$$

As will be explained later by the use of equations (18)–(26), the learning-mode-winner-unit candidate set $C(n^w{}_1(x_{k-1}))$ is the set of the units which exist in a specified range with respect to the learning-mode winner unit $n^w{}_1(x_{k-1})$ calculated by processing at the last position "k−1". Alternatively, it is the set of the units which exist in a specified range with respect to the learning-mode winner unit $n^w{}_1(x_{k-1})$ calculated by the processing at the last position "k−1", this specified range being determined on the basis of the movement information (such as the moving direction) which the learning adjustment device 305 obtains through the sensor information processor 303 from the movement control device 302.

As already explained in the section "Description of the Related Art", notwithstanding that the inputs $x_k$ (sensor information $d_k$) are given along the moving path of the mobile object, the learning rule in the prior art has been such that the learning-mode winner unit $n^w{}_1(x_k)$ at the current position "k" lying along the moving path is calculated without regard to the learning-mode winner unit $n_{w1}(x_{k-1})$ calculated at the last position "k−1".

In contrast, in the preferred embodiment as described above, the learning-mode winner unit $n^w{}_1(x_k)$ at the current position "k" is determined under the restrictions based on the moving path of the mobile object. Therefore, the embodiment has the great feature that the learning process proceeds efficiently and accurately.

After determining the learning-mode winner unit $n^w{}_1(x_k)$ at the current position "k" in the above way, the learning adjustment device 305 determines, around the determined winner unit, a learning-subject-unit, set $L(n^w{}_1(x_k))$ whose synaptic weights are to be altered, and it transfers the determined set to the learning execution device 306.

Simultaneously, the learning adjustment device 305 calculates a learning-mode-winner-unit candidate set $C(n^w{}_1(x_k))$ as a set of units which exist in a specified range with respect to the learning-mode winner unit $n^w{}_1(x_k)$, or as set of units which exist in a specified range with respect to the learning-mode winner unit $n^w{}_1(x_{k-1})$, this specified range being determined on the basis of the movement information (such as the moving direction) which the learning adjustment device 305 obtains through the sensor information processor 303 from the movement control device 302. Likewise as the above, the calculated candidate set is referenced as a learning-mode-winner-unit candidate set $C(n^w{}_1(x_k))$ in processing at the next position "k+1" lying along the moving path.

There will now be explained concrete setting examples of the learning-mode-winner-unit candidate set $C(n^w{}_1(x_{k-1}))$ and the learning-subject-unit set $L(n^w{}_1(x_k))$. For simplicity, the learning-mode winner unit $n^w{}_1(x_k)$ can be simply denoted by $n^w$. Accordingly, the candidate set $C(n^w{}_1(x_{k-1}))$ can be simply denoted by $C(n^w)$, and the unit set $L(n^w{}_1(x_k))$ by $L(n^w)$. Further, as explained before in the section "Explanation of Terms and Symbols", symbol $(i_n, j_n)$ designates the position of the unit No. "n" on the topological map, while symbol $(i_{nw}, j_{nw})$ designates the position of the learning-mode winner unit $n^w$ No. "n" on the topological map.

Setting Example #1

Figure 7:
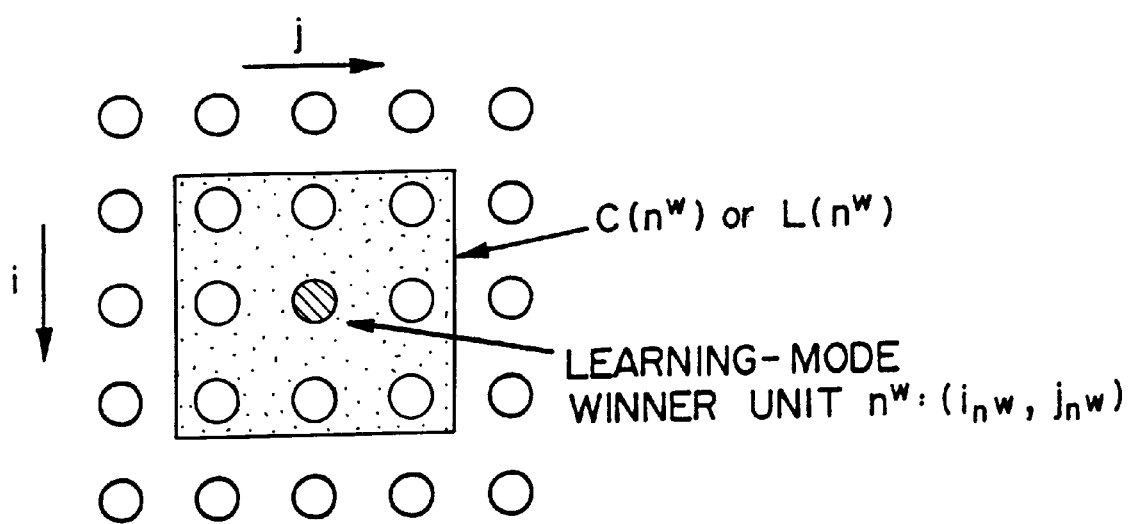
FIG. 7 is a diagram showing setting examples #1 and #2 for a learning-mode winner-unit-candidate set $C(n^w)$ and a learning-subject-unit set $L(n^w)$.

As indicated by the following equations (18), both the quantities $C(n^w)$ and $L(n^w)$ are set as sets, each of which consists of a learning-mode winner unit $n^w$ itself existing at a position $(i_{nw}, j_{nw})$ shown in FIG. 7, and eight units adjacent to the winner unit $n^w$, totalling nine units:

$$C(n^w) = \{n:(i_n, j_n), |i_n - i_{nw}| \leq 1, |j_n - j_{nw}| \leq 1\} L(n^w) = C(n^w) \quad (18)$$

Setting Example #2

Figure 8:
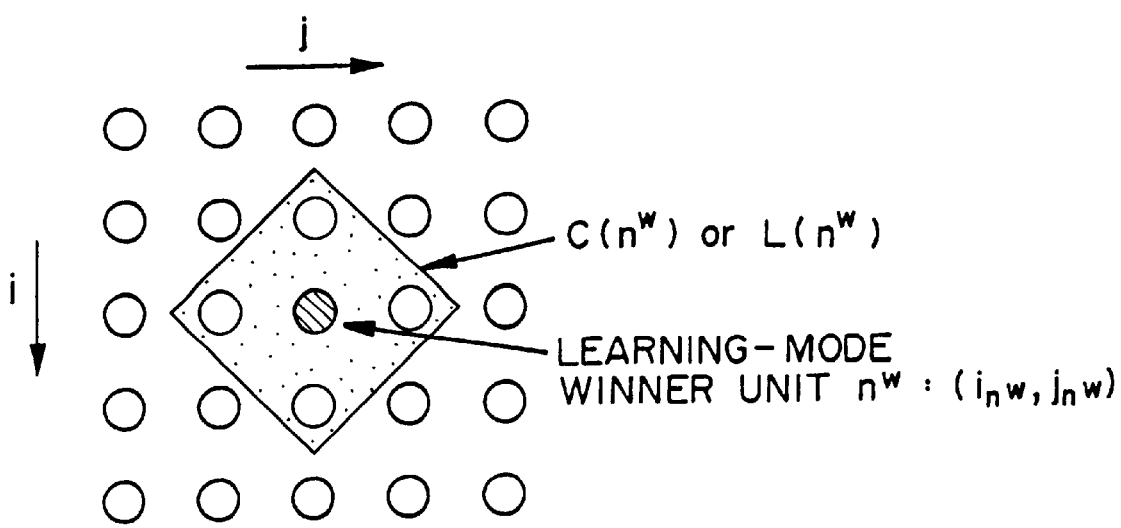
FIG. 8 is a diagram showing the setting example #2 for the set $C(n^w)$ and the set $L(n^w)$.

As indicated by the following equations (19), the quantity $C(n^w)$ is set as a set which consists of a learning-mode winner unit $n^w$, itself existing at a position $(i_{nw}, j_{nw})$ shown in FIG. 8, and four units lying at the upper, lower, right and left positions of the position $(i_{nw}, j_{nw})$ totalling five units, while the quantity $L(n^w)$ is set as the same set as shown in FIG. 7.

$$C(n^w) = \{n : (i_{nw}, j_{nw}), (i_{nw} - 1, j_{nw}), (i_{nw} + 1, j_{nw}), \quad (19)$$
$$(i_{nw}, j_{nw} - 1), (i_{nw}, j_{nw} + 1),\}$$

$$L(n^w) = \{n : (i_n, j_n), |i_n - i_{nw}| \leq 1, |j_n - j_{nw}| \leq 1\}$$

Setting Example #3

As indicated by the following equations (20), both the quantities $C(n^w)$ and $L(n^w)$ are set as sets, each of which consists of a learning-mode winner unit $n^w$ itself existing at a position $(i_{nw}, j_{nw})$ shown in FIG. 8, and four units lying at the upper, lower, right and left positions of the position $(i_{nw}, j_{nw})$ totalling five units:

$$C(n^w) = \{n : (i_{nw}, j_{nw}), (i_{nw} - 1, j_{nw}), (i_{nw} + 1, j_{nw}), \quad (20)$$
$$(i_{nw}, j_{nw} - 1), (i_{nw}, j_{nw} + 1),\}$$

$$L(n^w) = C(n^w)$$

Setting Example #4

In each of the foregoing setting examples #1–#3, the sets $C(n^w)$ and $L(n^w)$ have their respective ranges determined from only the learning-mode winner unit $n^w$ calculated by the processing at the last position which lies along the moving path.

In the setting example #4, the ranges of the quantities $C(n^w)$ and $L(n^w)$ are set by considering the moving direction of the mobile object in addition to the winner unit $n^w$.

Figure 9A:
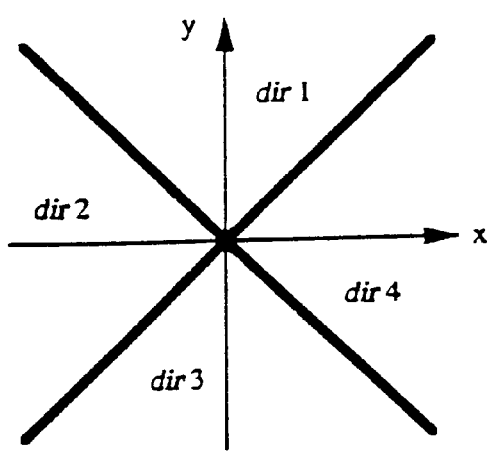
FIGS. 9A and 9B are diagrams each showing the classification of the moving directions of the mobile robot.

First, the moving directions of the mobile object are classified into four at intervals of 90° as shown in FIG. 9A and indicated by the equation (21). The learning adjustment device 305 receives the moving direction information (movement information) through the sensor information processor 303 from the movement control device 302.

$$\text{dir } 1 = [45°, 135°]$$

$$\text{dir } 2 = [135°, 225°]$$

$$\text{dir } 3 = [225°, 315°]$$

$$\text{dir } 4 = [-45°, 45°] \quad (21)$$

As indicated by the following equation (22), the quantity $C(n^w)$ is set in accordance with the moving direction as the set of units illustrated in any of FIGS. 10A–10D, this set centering on the learning-mode winner unit $n^w$ existing at the position $(i_{nw}, j_{nw})$ (a black circle in each of the corresponding FIGS. 10A–10D):

$$C(n^w) = \begin{cases} \{n : (i_{nw}, j_{nw}), (i_{nw} - 1, j_{nw} - 1), \\ \quad (i_{nw} - 1, j_{nw}), (i_{nw} - 1, j_{nw} + 1),\}, & \text{if } dir\ 1 \\ \\ \{n : (i_{nw}, j_{nw}), (i_{nw} - 1, j_{nw} - 1), \\ \quad (i_{nw}, j_{nw} - 1), (i_{nw} + 1, j_{nw} - 1),\}, & \text{if } dir\ 2 \\ \\ \{n : (i_{nw}, j_{nw}), (i_{nw} + 1, j_{nw} - 1), \\ \quad (i_{nw} + 1, j_{nw}), (i_{nw} + 1, j_{nw} + 1),\}, & \text{if } dir\ 3 \\ \\ \{n : (i_{nw}, j_{nw}), (i_{nw} - 1, j_{nw} + 1), \\ \quad (i_{nw}, j_{nw} + 1), (i_{nw} + 1, j_{nw} + 1),\}, & \text{if } dir\ 4 \end{cases} \quad (22)$$

On the other hand, the quantity $L(n^w)$ is set to be identical to the quantity $C(n^w)$ as indicated by the following equation (23), or it is set as the set of the units shown in FIG. 7, as indicated by the following equation (24):

$$L(n^w) = C(n^w) \quad (23)$$

$$L(n^w) = \{n : (i_n, j_n), |i_n - i_{nw}| \leq 1, |j_n - j_{nw}| \leq 1\} \quad (24)$$

Setting Example #5

Figure 9B:
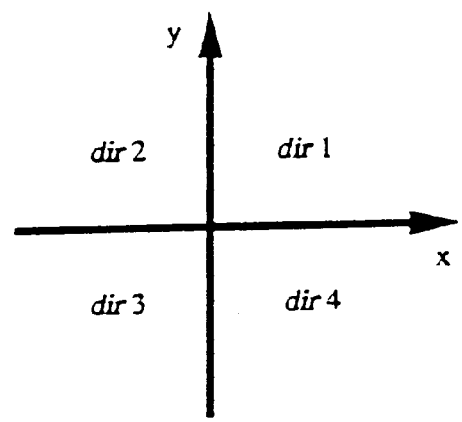

In the setting example #5, the moving directions of the mobile object are classified into four at intervals of 90° as shown in FIG. 9B, and indicated by the following equation (25):

$$dir\ 1 = [0°, 90°]$$
$$dir\ 2 = [90°, 180°]$$
$$dir\ 3 = [180°, 270°]$$
$$dir\ 4 = [270°, 360°] \quad (25)$$

As indicated by the following equation (26), the quantity $C(n^w)$ is set in accordance with the moving direction as the set of units illustrated in any of FIGS. 11A–11D, this set centering on the learning-mode winner unit $n^w$ existing at the position $(i_{nw}, j_{nw})$ (a black circle in each of the corresponding FIGS. 11A–11D):

$$C(n^w) = \begin{cases} \{n : (i_{nw}, j_{nw}), (i_{nw} - 1, j_{nw}), \\ \quad (i_{nw} - 1, j_{nw} + 1), (i_{nw}, j_{nw} + 1),\}, & \text{if } dir\ 1 \\ \\ \{n : (i_{nw}, j_{nw}), (i_{nw} - 1, j_{nw} - 1), \\ \quad (i_{nw} - 1, j_{nw}), (i_{nw}, j_{nw} - 1),\}, & \text{if } dir\ 2 \\ \\ \{n : (i_{nw}, j_{nw}), (i_{nw}, j_{nw} - 1), \\ \quad (i_{nw} + 1, j_{nw} - 1), (i_{nw} + 1, j_{nw}),\}, & \text{if } dir\ 3 \\ \\ \{n : (i_{nw}, j_{nw}), (i_{nw}, j_{nw} + 1), \\ \quad (i_{nw} + 1, j_{nw}), (i_{nw} + 1, j_{nw} + 1),\}, & \text{if } dir\ 4 \end{cases} \quad (26)$$

In the same manner as in the setting example #4, the quantity $L(n^w)$ is set to be identical to the quantity $C(n^w)$ as indicated by the equation (23) mentioned before, or it is set as the set of the units shown in FIG. 7, as indicated by the equation (24) mentioned before.

Explanation of Learning Execution Device 306

Next, the learning execution device 306 shown in FIG. 3 operates in the map learning mode to receive the learning-subject-unit set $L(n^w_1(x_k))$ at the current position "k" along the moving path from the learning adjustment device 305 explained above, and to compute the variations $\Delta w_i$ of synaptic weights $w_i$ in accordance with the following equation (27):

$$\Delta w_i = \begin{cases} \eta(x_k - w_i), & \text{for } i \in L(n_l^w(x_k)) \\ 0, & \text{for } i \notin L(n_l^w(x_k)) \end{cases} \quad (27)$$

Here, the plus constant $\eta$ is the same as in Eq. (5).

Thus, only the synaptic weights $w_i$ of the units belonging to the learning-subject-unit set $L((n^w_1(x_k))$ are altered by learning without changing the synaptic weights $w_i$ of the other units.

Thereafter, using the variations $\Delta w_i$ computed with Eq. (27), the synaptic weights $w_i$ are updated on the basis of equation (28) given below. Here, the denominator of the right-hand side of the equation (28) is a term for normalization intended to bring the norm of the synaptic weight $w_i$ to 1 (unity).

$$w_i = \frac{w_i + \Delta w_i}{\|w_i + \Delta w_i\|} \quad (28)$$

Explanation of the Operation of the Whole System in the Map Learning Mode

FIG. 12 is a flowchart showing the operation of the map learning system of FIG. 3 in the map learning mode.

First, the sensor array 301 acquires sensor information $d_k$ at the current position "k" of the movement of a mobile object (step 1201 in FIG. 12).

Secondly, the sensor information processor 303 computes inputs $x_k$ corresponding to the sensor information $d_k$ at the current movement position "k", in accordance with Eqs. (12)–(14) (step 1202 in FIG. 12).

Next, the learning adjustment device 305 computes the outputs $w_i \cdot x_k$, $i \in C(n^w_1(x_{k-1}))$ of individual units within the range of a learning-mode-winner-unit candidate set $C(n^w_1(x_{k-1}))$ calculated at the last position "k−1" which lies along the moving path of the movement (step 1203 in FIG. 12).

Subsequently, the learning adjustment device 305 determines a learning-mode winner unit $n^w_1(x_k)$ at the current position "k" lying along the moving path, from the outputs computed at the step 1203 and in accordance with Eq. (17) (step 1204 in FIG. 12).

Next, the learning adjustment device 305 determines a learning-subject-unit set $L(n^w_1(x_k))$ at the current position k and a learning-mode-winner-unit candidate set $C(n^w_1(x_k))$ for the next position "k+1", in accordance with Eqs. (18)–(26) (step 1205 in FIG. 12). The set $L(n^w_1(x_k))$ thus determined is transferred to the learning execution device 306. In addition, the learning-mode-winner-unit candidate set $C(n^w_1(x_k))$ determined is referenced in the processing of the learning adjustment device 305 (step 1203 in FIG. 12) at the next position "k+1" lying along the moving path.

Subsequently, the learning execution device 306 executes learning for the synaptic weights $w^i$ of the units belonging to the learning-subject-unit set $L(n^w_1(x_k))$ transferred from the learning adjustment device 305, in accordance with Eqs. (27) and (28) (step 1206 in FIG. 12).

At the subsequent step, the movement control device 302 decides whether or not the current position "k" is the final or end position of the movement (step 1207 in FIG. 12). Subject to the decision that the current position "k" is not final, the device 302 performs a movement control toward the next position "k+1" (from steps 1207→1208→1201 in FIG. 12), and subject to the decision that the position "k" is final, the device 302 ends the movement control so as to end the process of the map learning mode.

Figure 13:
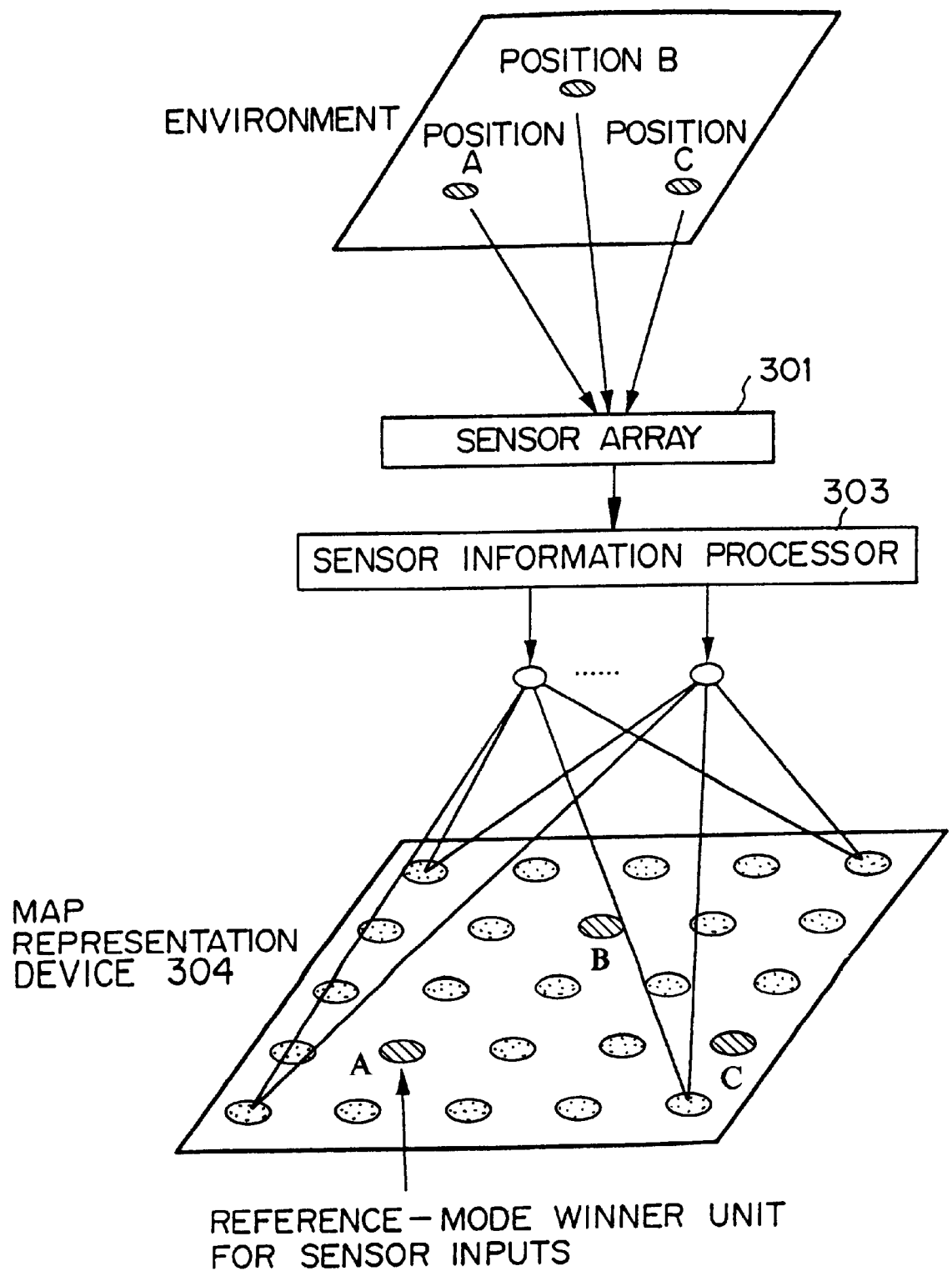
FIG. 13 is a model diagram for explaining the state of a map after learning (a topological map)

In a case where, after the end of the process of the map learning mode thus far described, the process of the map reference mode is executed as illustrated in the operating flow chart of FIG. 6 referred to in the section "Explanation of Map Representation Device 304", the relations among the individual positions "k's" of the mobile object within the actual environment come to favorably agree with the positional relationships among the respective reference-mode winner units $n^w{}_r(x_k)$ computed in the topological map within the map representation device 304, as illustrated in FIG. 13.

Explanation of Example of Hardware Architecture

FIG. 14 is a block diagram showing an architectural example of the case where the map learning system in this preferred embodiment depicted in FIG. 3 is constructed by hardware.

Referring to FIG. 14, an input unit 1401 corresponds to the sensor array 301 and sensor information processor 303 shown in FIG. 3, a parallel computation unit 1402 corresponds to the map representation device 304 shown in FIG. 3, a controller for map learning 1403 corresponds to the learning adjustment device 305 and learning execution device 306 shown in FIG. 3, and an output unit 1404 corresponds to some of the functions of the movement control device 302 shown in FIG. 3. In addition, a display unit 1405 displays a map or chart on the basis of the outputs of the parallel computation unit 1402. Herein, the input unit 1401, parallel computation unit 1402, map-learning controller 1403, output unit 1404 and display unit 1405 are interconnected by a bus 1406.

The feature of the architecture shown in FIG. 14 is that the parallel computation unit 1402 is constructed in parallel in correspondence with the individual units or neurons of the topological map, so the computations dependent upon the individual units of the topological map as indicated by the step 603 in FIG. 6, the step 1203 in FIG. 12, or the step 1206 in FIG. 12, can be concurrently executed in parallel. Thus, the processes in the map reference mode and the map learning mode are possible to proceed at high speeds.

Explanation of the Result of a Simulation Experiment

Figure 15:
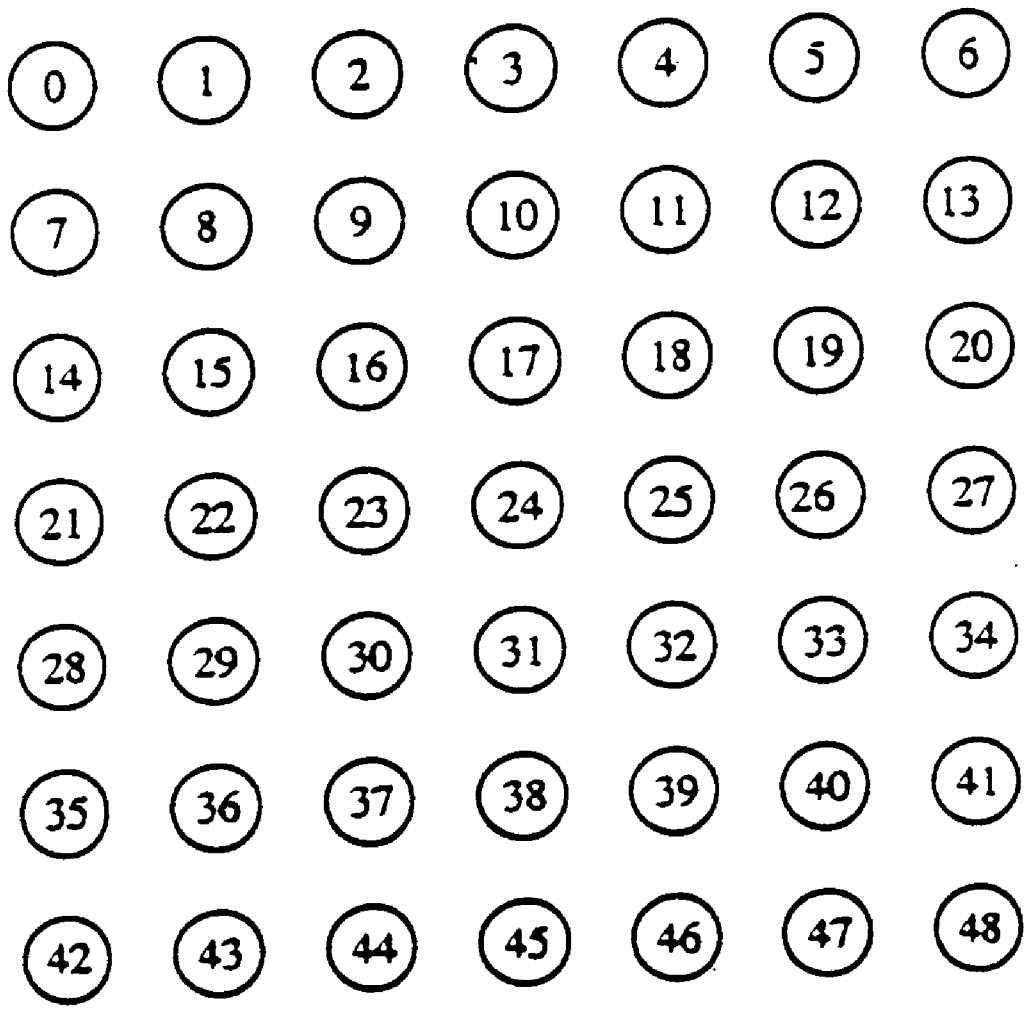
FIG. 15 is a diagram showing the Nos. of the units or neurons on a topological map in an experiment.

In order to demonstrate the validity of the preferred embodiment described above, a computer simulation experiment was conducted. The conditions of the experiment were as follows:

Number of the units or neurons of the topological map: N=49(=7×7). Nos. indicated in FIG. 15 are assigned to the respective units or neurons.

Radius of the circular environment shown in FIG. 4: R=1.0 [m].

Central position (coordinates) of the circular environment shown in FIG. 4: Origin (0, 0).

Number of the landmarks: M=3.

Positions (coordinates) of the landmarks: (1.0, 0), (0, 1.0) and (−⅔, −⅔).

Number of the Gaussian filters for distances $d_k^{(m)}$ (1≦k≦200, 1≦m≦3) from the landmarks: G=11.

Maximum and minimum distances among the landmarks: (max, min)=(2.0, 0).

Total number of the learning positions which lie along the moving path: 200 points at intervals of 0.2 [m].

Figure 16:
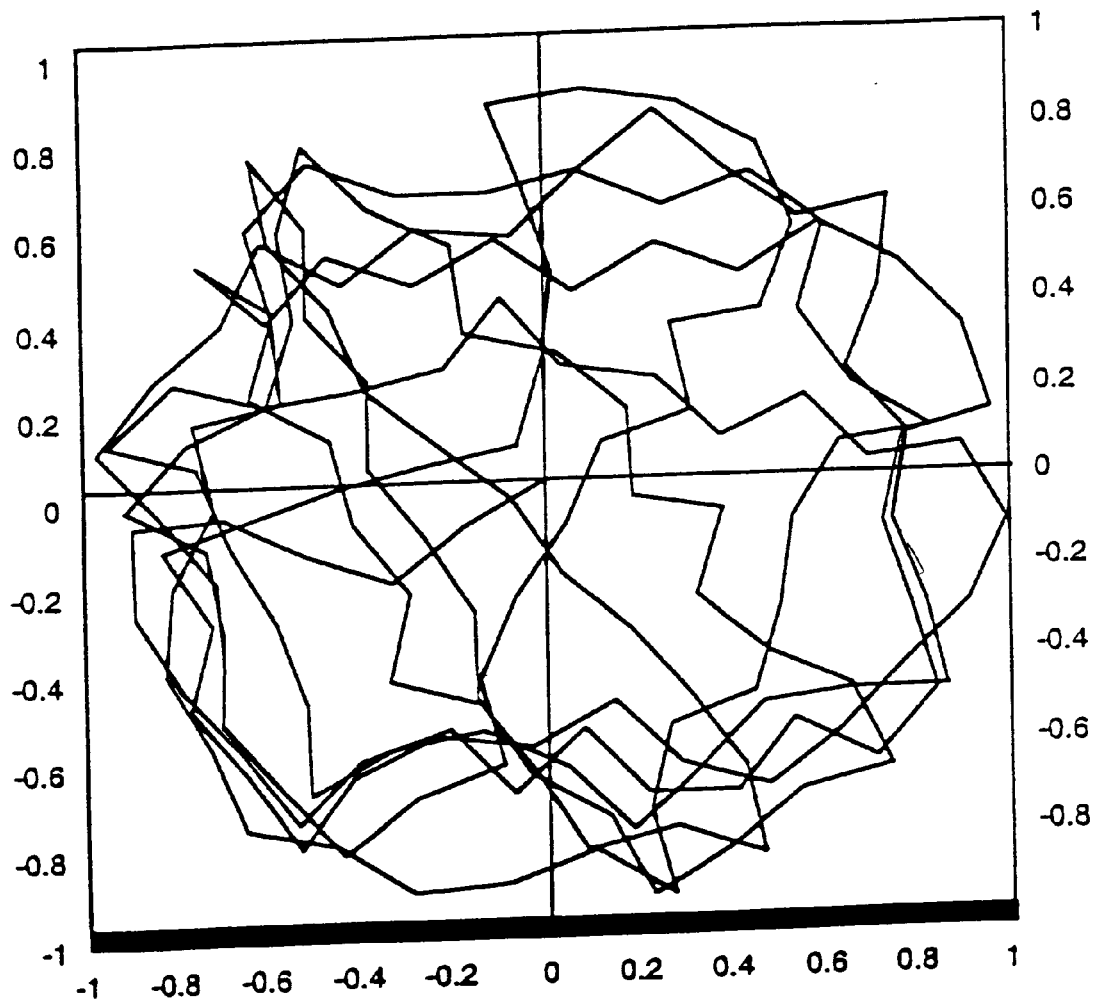
FIG. 16 is a diagram showing the moving path of the mobile robot.

Moving path: As illustrated in FIG. 16, the mobile object starts its movement at the origin (0, 0) and moves about within the environment substantially at random.

Synaptic weights $w_i$ before the learning process: Although these weights are set at random, they are normalized.

In the ensuing description, a simulation result in the case of adopting the prior-art learning rule of the topological map as based on Eqs. (4) and (5) shall be explained first, followed by the simulation result in the case of adopting the learning rule of the topological map in this preferred embodiment as based on Eqs. (17), (27) and (28).

(A) State before Learning

FIG. 17 is a diagram showing the situation of the map (topological map) before the learning process. This diagram has been obtained as stated below. It is assumed that the mobile robot is at positions (0.1x, 0.1y) on a lattice having lattice intervals of 0.1 [m], within the circular environment. The sensor information items $d_k$ measured at the positions are converted into the inputs $x_k$, whereupon the resulting data are entered into the topological map. The Nos. of the reference-mode winner units $n^w{}_r(x_k)$ thus found are written at the above positions.

As understood from FIG. 17, the synaptic weights $w_i$ of the topological map before the learning process are random, so that the positional relationships of the units or neurons arranged as shown in FIG. 15 are quite independent of the positional relations of the mobile robot within a coordinate system as shown in FIG. 16.

(B) Case of Adopting the Prior-art Learning Rule

Figure 18:
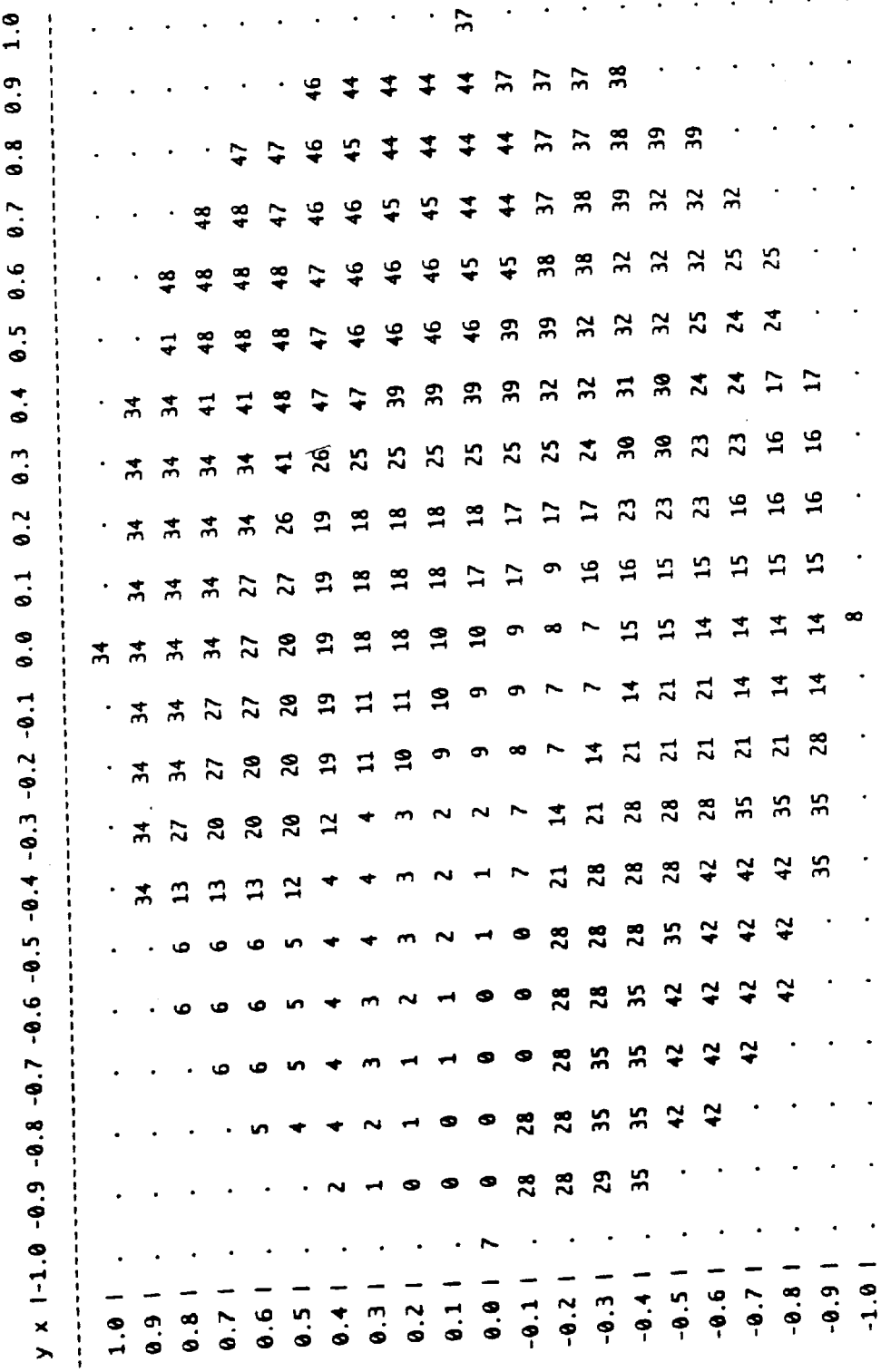
FIG. 18 is a diagram showing the state of a map after learning under a prior-art learning rule (the arrangement of winner units)

FIG. 18 is a diagram showing the situation of a map (topological map) obtained after the learning process was executed 2000 times in accordance with the prior-art learning rule of the topological map as based on Eqs. (4) and (5). In FIG. 18, the positional relationships of the units or neurons arranged as shown in FIG. 15 and the positional relationships of the mobile robot within the coordinate system shown in FIG. 16 are in partial agreement as to relative positions, but some parts are distorted in the map. It is accordingly understood that a correct map has not been obtained as a whole.

(C) Case of Adopting the Learning Rule in the Preferred Embodiment

Figure 19:
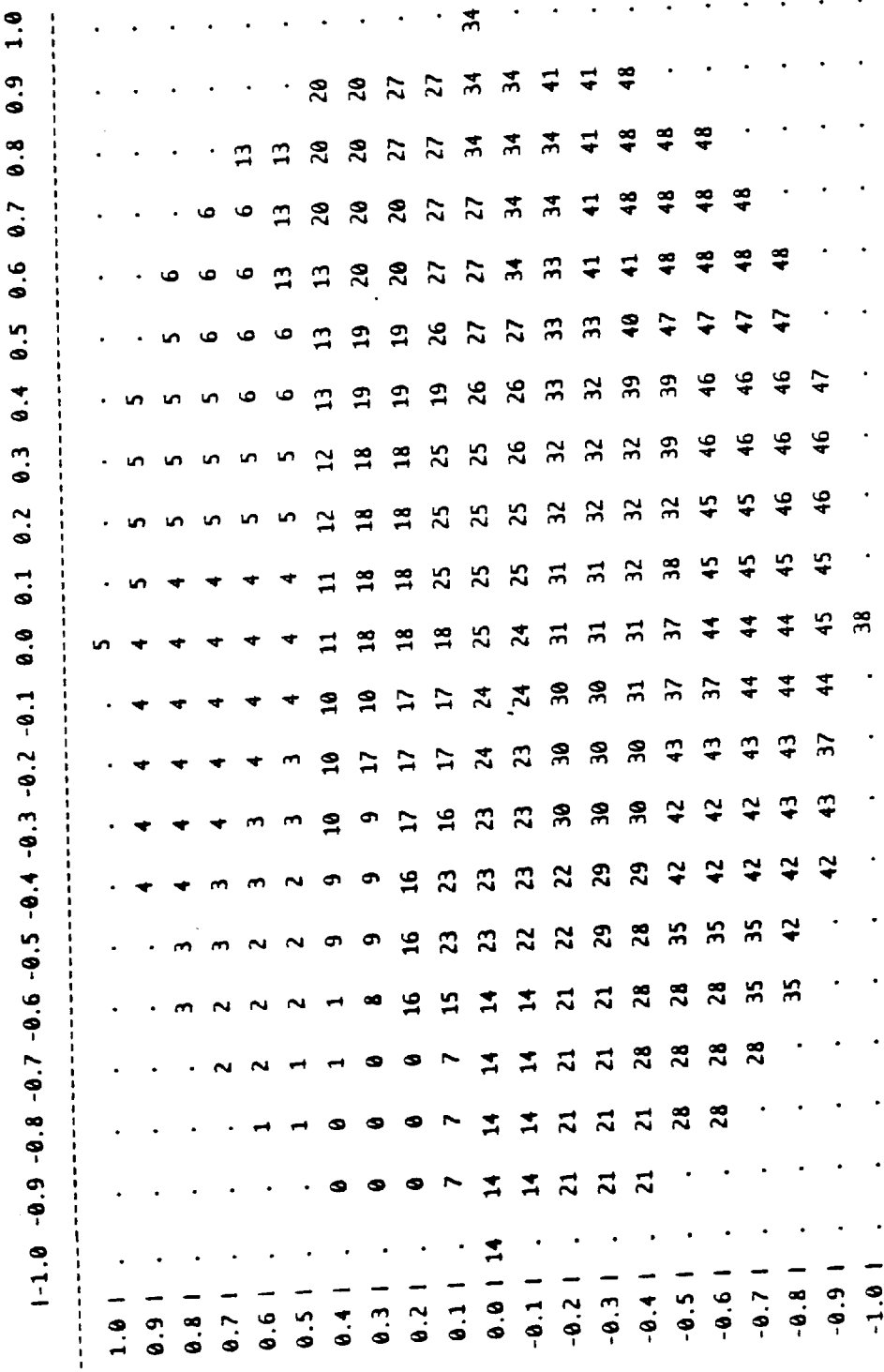
FIG. 19 is a diagram showing the state of a map after learning under a learning rule in the preferred embodiment (the arrangement of winner units) (in the case where the sets $C(n^w)$ and $L(n^w)$ have been determined using the setting example #4).

FIG. 19 is a diagram showing the situation of a map (topological map) obtained after the learning process was executed 2000 times in a case where the learning rule of the topological map, according to this preferred embodiment as based on Eqs. (17), (27) and (28), was conformed to, and where the sets $C(n^w)$ and $L(n^w)$ were set as indicated by Eqs. (22) and (24) and as shown in FIG. 9A and FIGS. 10A–10D. As understood from FIG. 19, the positional relationships of the units arranged as shown in FIG. 15 and the positional relationships of the mobile robot within the coordinate system shown in FIG. 16 are in very good agreement, and the map has been accurately formed from the sensor information $d_k$.

Incidentally, in the experimental simulation here, the circular environment shown in FIG. 4 is reflected in the square topological map shown in FIG. 15. In this regard, a more accurate map can be formed by bringing the shapes of the environment and the topological map into agreement.

Explanation of Other Preferred Embodiments

According to the preferred embodiment described above, in the map learning mode, the range of the learning-mode winner unit $n^w{}_1(x_k)$ at the current position "k" is limited on the basis of the learning-mode winner unit $n^w{}_1(x_{k-1})$ obtained by the processing at the last position "k−1" (the position directly preceding the current position "k") which lies along the moving path. The above range, however, may well be limited on the basis of processed results at a plurality of positions which include the last position "k−1" and earlier position/positions.

Moreover, the foregoing preferred embodiment has also been described for the example in which the range of the learning-mode winner unit $n^w{}_l(x_k)$ at the current position "k" is limited on the basis of the moving direction. The above range, however, may well be limited on the basis of any of other various items of movement information including a moving speed.

Further, in the foregoing preferred embodiment, not only the range of the learning-mode winner unit $n^w{}_l(x_k)$ in the map learning mode, but also the range of the reference-mode winner unit $n^w{}_r(x_k)$ in the map reference mode may well be limited on the basis of information relevant to the moving path.

Further, this preferred embodiment used as an example the learning rule in the case of applying the topological map to the use of the map or chart of the mobile object. However, the present invention is not restricted to this example, but it can sharply enhance the efficiencies and precisions of various learning processes or reference processes in such a way that a learning-mode winner unit or a reference-mode winner unit is limited on the basis of information indicating the continuity of changes in patterns, in many fields of application of topological maps such as the sorting of inputs, motion controls, speech recognition, vector quantization, and combination optimizing problems.

What is claimed is:

1. A computation system for a neural network having N units arranged in two dimensions, said system comprising:
   candidate-set selection means for selecting from the N units of the neural network a set of candidates for a winner unit corresponding to an input vector at a current input timing; and
   winner-unit selection means for selecting as the winner unit a unit from the candidate set, the selected unit being a unit that has received a maximum input among inputs to the units of the candidate set, the input to each unit being determined as a scalar product of the input vector and a synaptic weight vector.

2. A computation system as defined in claim 1, wherein the winner unit is selected for a learning process which updates the synaptic weight vectors of the respective units of the neural network.

3. A computation system as defined in claim 1, wherein the winner unit is selected for a reference process of the neural network.

4. A computation system as defined in claim 1, wherein:
   the neural network corresponds to a map for navigating a moving path of a mobile object within an environment; and
   the input vector corresponds to sensor information indicating a position of the mobile object within the environment.

5. A computation system as defined in claim 1, wherein said candidate-set selection means selects the candidate set based on a past winner unit selected at a past input timing near the current input timing.

6. A computation system as defined in claim 5, wherein:
   the past input timing immediately precedes the current input timing;
   the neural network corresponds to a map for navigating a moving path of a mobile object within an environment;
   the input vector corresponds to sensor information indicating a position of the mobile object within the environment;
   the winner unit is selected for a learning process which updates the synaptic weight vectors of the respective units of the neural network; and
   said candidate-set selection means selects as the candidate set a set $C(n^w)$ satisfying the following equation, where symbol $(i_{nw}, j_{nw})$ denotes a position of the past winner unit, and symbol $(i_n, j_n)$ denotes a position of a unit n selected for the candidate set:

$$C(n^w) = \{n:(i_n, j_n), |i_n - i_{nw}| \leq 1, |j_n - j_{nw}| \leq 1\}.$$

7. A computation system as defined in claim 5, wherein:
   the past input timing immediately precedes the current input timing;
   the neural network corresponds to a map for navigating a moving path of a mobile object within an environment;
   the input vector corresponds to sensor information indicating a position of the mobile object within the environment;
   the winner unit is selected for a learning process which updates the synaptic weight vectors of the respective units of the neural network; and
   said candidate-set selection means selects as the candidate set a set $C(n^w)$ satisfying the following equation, where symbol $(i_{nw}, j_{nw})$ denotes a position of the past winner unit, and symbol $(i_n, j_n)$ denotes a position of a unit n selected for the candidate set:

$$C(n^w) = \{n:(i_{nw}, j_{nw}), (i_{nw}-1, j_{nw}), (i_{nw}+1, j_{nw}), (i_{nw}, j_{nw}-1), (i_{nw}, j_{nw}+1),\}.$$

8. A computation system as defined in claim 1, further comprising
   directional-change calculation means for calculating a directional change for the input vector at the current input timing; wherein
   said candidate-set selection means selects the candidate set based on a past winner unit selected at a past input timing near said current input timing and the directional change for the input vector.

9. A computation system as defined in claim 8, wherein:
   the past input timing immediately precedes the current input timing;
   the neural network corresponds to a map for navigating a moving path of a mobile object within an environment;
   the input vector corresponds to sensor information indicating a position of the mobile object within the environment;
   the winner unit is selected for a learning process which updates the synaptic weight vectors of the respective units of the neural network;
   said directional-change calculation means calculates the directional change as one of directions dir1, dir2, dir3 and dir4 defined by dir 1=[45°, 135°]

dir 2=[135°, 225°]

dir 3=[225°, 315°]

dir 4=[−45°, 45°]

and
   said candidate-set selection means selects as the candidate set a set $C(n^w)$ satisfying the following equation, where symbol $(i_{nw}, j_{nw})$ denotes a position of the past winner unit, and in accordance with the directional change:

$$C(n^w) = \{n : (i_{nw}, j_{nw}), (i_{nw} - 1, j_{nw} - 1),$$
$$(i_{nw} - 1, j_{nw}), (i_{nw} - 1, j_{nw} + 1),\},$$

if the directional change is *dir* 1

$$\{n : (i_{nw}, j_{nw}), (i_{nw} - 1, j_{nw} - 1),$$
$$(i_{nw}, j_{nw} - 1), (i_{nw} + 1, j_{nw} - 1),\},$$

if the directional change is *dir* 2

$$\{n : (i_{nw}, j_{nw}), (i_{nw} + 1, j_{nw} - 1),$$
$$(i_{nw} + 1, j_{nw}), (i_{nw} + 1, j_{nw} + 1),\},$$

if the directional change is *dir* 3

$$\{n : (i_{nw}, j_{nw}), (i_{nw} - 1, j_{nw} + 1),$$
$$(i_{nw}, j_{nw} + 1), (i_{nw} + 1, j_{nw} + 1),\},$$

if the directional change is *dir* 4.

10. A computation system as defined in claim 8, wherein:

the past input timing immediately precedes the current input timing;

the neural network corresponds to a map for navigating a moving path of a mobile object within an environment;

the input vector corresponds to sensor information indicating a position of the mobile object within the environment;

the winner unit is selected for a learning process which updates the synaptic weight vectors of the respective units of the neural network;

said directional-change calculation means calculates the directional change as one of directions dir1, dir2, dir3 and dir4 defined by dir 1=[0°, 90°]

dir 2=[90°, 180°]

dir 3=[180°, 270°]

dir 4=[270°, 360°]

and said candidate-set selection means selects as the candidate set a set $C(n^w)$ satisfying the following equation and based on the directional change, where symbol $(i_{nw}, j_{nw})$ denotes a position of the past winner unit and symbol $(i_n, j_n)$ denotes a position of a unit n selected for the candidate set:

$$C(n^w) = n : (i_{nw}, j_{nw}), (i_{nw} - 1, j_{nw}),$$
$$(i_{nw} - 1, j_{nw} + 1), (i_{nw}, j_{nw} + 1)\},$$

if the directional change is *dir* 1

-continued $$n : (i_{nw}, j_{nw}), (i_{nw} - 1, j_{nw} - 1),$$
$$(i_{nw} - 1, j_{nw}), (i_{nw}, j_{nw} - 1)\},$$

if the directional change is *dir* 2

$$n : (i_{nw}, j_{nw}), (i_{nw}, j_{nw} - 1),$$
$$(i_{nw} + 1, j_{nw} - 1), (i_{nw} + 1, j_{nw})\},$$

if the directional change is *dir* 3

$$n : (i_{nw}, j_{nw}), (i_{nw}, j_{nw} + 1),$$
$$(i_{nw} + 1, j_{nw}), (i_{nw} + 1, j_{nw} + 1)\},$$

if the directional change is *dir* 4.

11. A computation system as defined in claim 8, wherein said winner unit is selected for a learning process which updates the synaptic weight vectors of the respective units of the neural network, said computation system further comprising:

means for selecting from the units of the neural network a learning set of units for updating of the respective synaptic weight vectors thereof, the learning set being selected based on the winner unit and the directional change; and updating means for submitting the units of the learning set to a learning process for updating the respective synaptic weight vectors thereof.

12. A computation method for a neural network having N units arranged in two dimensions, said method comprising the steps of:

selecting from the N units of the neural network a candidate set of candidates for a winner unit corresponding to an input vector at a current input timing; and selecting a unit of the candidate set as the winner unit the selected unit having received a maximum input among inputs to the units of the candidate set, the input to each unit being determined as a scalar product of the input vector and a synaptic weight vector.

13. A computer-readable storage medium encoded with a program for controlling a neural network having N units arranged in two dimensions, said program comprising the functions of:

selecting from the N units of the neural network a candidate set of candidates for a winner unit corresponding to an input vector at a current input timing; and selecting a unit of the candidate set as the winner unit the selected unit having received a maximum input among inputs to the units of the candidate set, the input to each unit being determined as a scalar product of the input vector and a synaptic weight vector.

\* \* \* \* \*